ns(12) United States Patent
Akune et al.

(10) Patent No.: US 10,579,461 B2
(45) Date of Patent: Mar. 3, 2020

(54) LOG MESSAGE GROUPING APPARATUS, LOG MESSAGE GROUPING SYSTEM, AND LOG MESSAGE GROUPING METHOD

(71) Applicant: HITACHI, LTD., Tokyo (JP)

(72) Inventors: Ken Akune, Tokyo (JP); Yoji Ozawa, Tokyo (JP); Junji Kinoshita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 175 days.

(21) Appl. No.: 15/864,829

(22) Filed: Jan. 8, 2018

(65) Prior Publication Data

US 2018/0203757 A1      Jul. 19, 2018

(30) Foreign Application Priority Data

Jan. 16, 2017   (JP) .................................. 2017-004788

(51) Int. Cl.
*G06F 11/07* (2006.01)
*G06F 11/34* (2006.01)
*G06F 11/22* (2006.01)

(52) U.S. Cl.
CPC ........ *G06F 11/079* (2013.01); *G06F 11/0766* (2013.01); *G06F 11/0769* (2013.01); *G06F 11/0778* (2013.01); *G06F 11/0781* (2013.01); *G06F 11/0784* (2013.01); *G06F 11/0787* (2013.01); *G06F 11/2268* (2013.01); *G06F 11/3476* (2013.01)

(58) Field of Classification Search
CPC ............. G06F 11/079; G06F 11/0769; G06F 11/0778; G06F 11/0787; G06F 11/3476; G06F 11/2268; G06F 11/0766; G06F 11/0781; G06F 11/0784
See application file for complete search history.

(56) References Cited

U.S. PATENT DOCUMENTS 9,612,897 B1 *    4/2017   Bernico ................ G06F 11/079
2011/0314332 A1 * 12/2011  Shimada ............ G06F 11/0709
                                                        714/26
2014/0344622 A1 * 11/2014  Huang .................. G06F 11/079
                                                        714/37

(Continued)

FOREIGN PATENT DOCUMENTS

JP      2016-076020 A     5/2016
WO      2016/132717 A1    8/2016

*Primary Examiner* — Paul Contino
(74) *Attorney, Agent, or Firm* — Volpe and Koenig, P.C.

(57) ABSTRACT

A log message grouping apparatus calculates a coincidence degree evaluation value E1 representing the degree of coincidence between minority words, which are relatively low occurrence frequency words, out of the words that form a log message and minority words in another log message. The log message grouping apparatus further calculates an occurrence degree evaluation value E2 representing the degree of occurrence of the combination of a classification value of a log message and the classification value of a past log message on the basis of the occurrence frequency of the combination of the classification values and calculates an association degree evaluation value E3 representing the degree of association between the log message and the past log message on the basis of the coincidence degree evaluation value E1 and the occurrence degree evaluation value E2.

8 Claims, 13 Drawing Sheets

(56) References Cited

U.S. PATENT DOCUMENTS

| | | |
|---|---|---|
| 2016/0098473 A1 | 4/2016 | Hosokawa et al. |
| 2016/0103881 A1* | 4/2016 | Gukal .................. G06F 16/248 707/722 |
| 2016/0196174 A1* | 7/2016 | Jacob ................. G06F 11/0781 714/37 |
| 2016/0261541 A1* | 9/2016 | Samuni ............... G06F 11/0706 |
| 2018/0203757 A1* | 7/2018 | Akune ................. G06F 11/079 |

* cited by examiner

FIG. 4 (A)

EXAMPLES OF HIGH OCCURRENCE FREQUENCY WORD
_300

| TYPE | EXAMPLES OF WORD |
|---|---|
| LOG LEVEL | INFO, WARNING, ERROR |
| SOFTWARE NAME | authentication |
| HOST NAME | host1,host2,host3 |
| DATE | 2016-09-21,Sep 20 |
| ... | ... |

FIG. 4 (B)

EXAMPLES OF LOW OCCURRENCE FREQUENCY WORD
_310

| TYPE | EXAMPLES OF WORD |
|---|---|
| REQUEST ID | req-39fc0463-ff64-4566-bf84-7fe81f6d646d |
| USER ID | 0266a169ab404fe198ce2cc2cc9cb57d |
| INSTANCE ID | bc68a723-06f7-4815-afff-08f03be3ab6d |
| TIME POINT | 07:46:52 |
| ... | ... |

| REGISTRATION DATE (500) | WORD (501) | WORD OCCURRENCE FREQUENCY COUNT (502) |
|---|---|---|
| 2016-09-20 | w101 | 100,000 |
| 2016-09-20 | w102 | 1,000 |
| 2016-09-20 | w103 | 10 |
| ... | ... | ... |

| OCCURRENCE TIME POINT (600) | LOG MESSAGE STORAGE (601) | CLASSIFICATION VALUE STORAGE (602) | MINORITY WORD LIST (603) |
|---|---|---|---|
| T101 | M101 | 11000 | w3,w4,w10 |
| T102 | M102 | 1001 | w5,w10 |
| T103 | M103 | 100 | w10 |
| ... | ... | ... | ... |

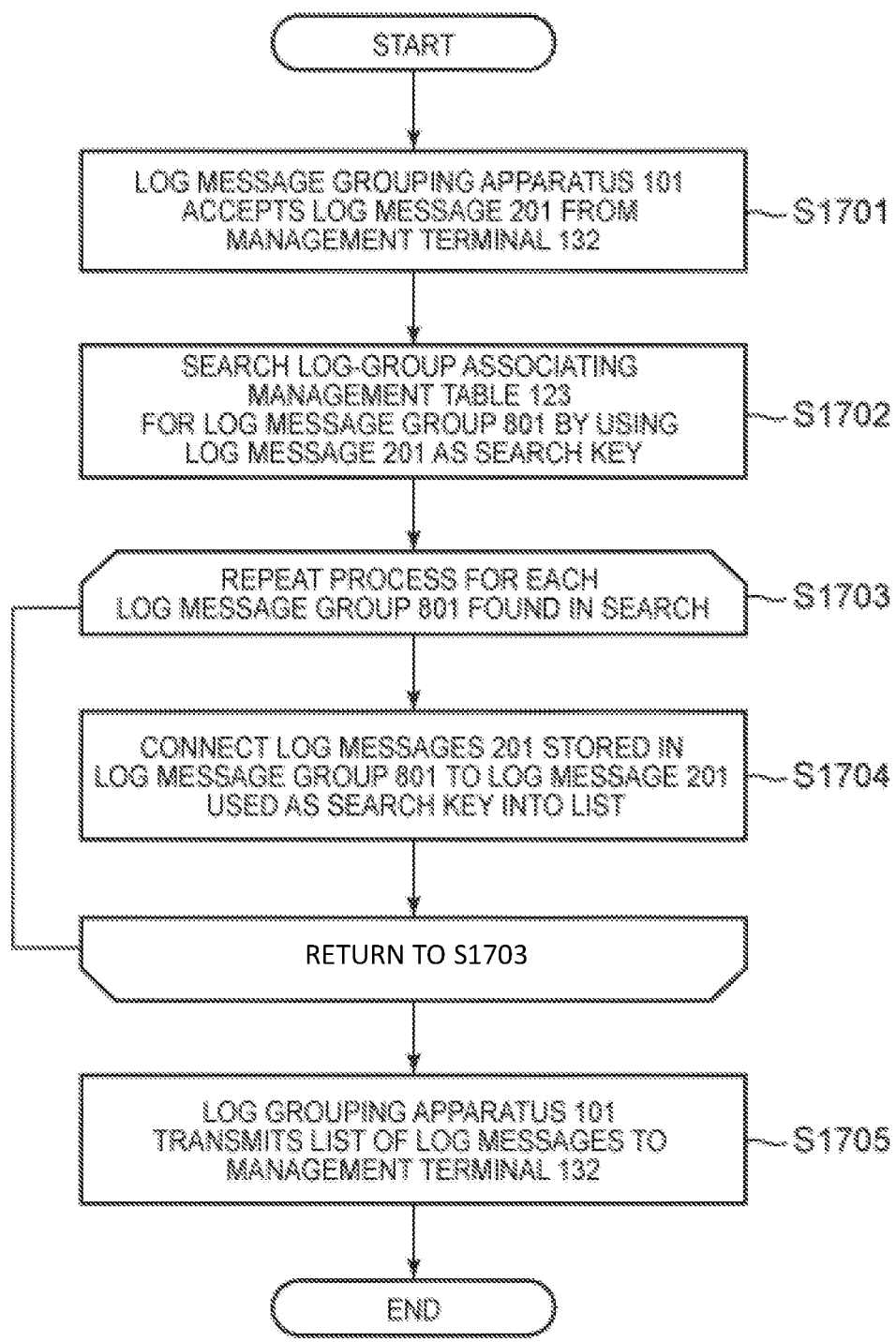

LOG MESSAGE GROUPING APPARATUS, LOG MESSAGE GROUPING SYSTEM, AND LOG MESSAGE GROUPING METHOD

BACKGROUND

The present invention relates to a log message grouping apparatus, a log message grouping system, and a log message grouping method that assist analysis of a log outputted by an information system.

An information system formed of software outputs a log containing a recorded log message showing the action state and other factors of the information system. In general, when system abnormality, such as failure, occurs in the information system, an operator of the information system analyzes the log outputted from the information system to locate a root cause of the system abnormality.

In the log analysis, only a log message clearly representing failure or a symptom thereof, such as an error or a warning, does not allow identification of a root cause of the system abnormality in some cases. The operator therefore extracts, from an enormous number of log messages contained in the log, for example, a first log message showing failure, a symptom thereof, and other factors and a second log message highly associated with the first log message and identifies a root cause by using the extracted log messages.

To extract the second log message associated with the first log message from the enormous number of log messages, a technology for assisting analysis of the log messages by associating the log messages with one another as a group is disclosed, for example, in International Publication No. 2016/132717 and Japanese Patent Laid-Open No. 2016-76020.

International Publication No. 2016/132717 discloses a technology for grouping log messages outputted when a target system is normally operating as a normal pattern that is the combination or time-course order of the log messages, analyzing a log by comparing the log with the normal pattern, storing a pattern that does not match with the normal pattern as an abnormal pattern, and analyzing other logs by using the normal pattern and the abnormal pattern.

Japanese Patent Laid-Open No. 2016-76020 discloses a technology for acquiring a sentence that describes a plurality of messages from a document associated with an output origin apparatus having outputted the plurality of messages and grouping messages associated with one another into a single group on the basis of the acquired description sentence.

SUMMARY

In software, which is developed at high speed, the output format of a log message is frequently changed, and a large number of types of output format are therefore present. It is therefore difficult to create information that associates log messages with one another in advance as a group, such as the normal pattern, as in International Publication No. 2016/132717. Further, in an information system that concurrently performs a plurality of similar processes, log messages outputted in accordance with the processes are likely to be nested with one another, and only the combination or time-course order of the log messages therefore provides insufficient grouping accuracy. Further, since the technology disclosed in Japanese Patent Laid-Open No. 2016-76020 requires acquisition of a sufficiently organized sentence that describes messages, it is difficult to create information that associates log messages with one another in advance as a group, as in International Publication No. 2016/132717.

An object of the present invention is to provide a log message grouping apparatus, a log message grouping system, and a log message grouping method that eliminates the need to prepare information that associates log messages with one another in advance as a group.

A log message grouping apparatus according to an embodiment of the present invention is a log message grouping apparatus including a processor, the log message grouping apparatus being characterized in that the processor is configured to (a) collect a log that records a plurality of log messages, (b) acquire the plurality of log messages from the log, (c) acquire an occurrence frequency of each word that forms a first log message from word-occurrence frequency association information that is created based on the plurality of log messages contained in the log and stores each word contained in the plurality of log messages and the occurrence frequency of the word with the word and the occurrence frequency associated with each other, (d) store, in log-word association information, the first log message and a word that is one of words that form the first log message and occurs by a frequency smaller than a predetermined occurrence frequency determination threshold with the first log message and the word as a minority word associated with each other, (e) acquire the minority word contained in a second log message earlier than the first log message from the log-word association information, and (f) calculate a first evaluation value that is an evaluation value representing a degree of coincidence between the minority word contained in the first log message and the minority word contained in the second log message.

In a preferable embodiment, the processor is configured to (g) produce a classification value that is information that identifies the first log message and is determined based on the occurrence frequency of each word that forms the first log message, (h) store, in the log-word association information, the first log message and the classification value of the first log message with the first log message and the classification value associated with each other, (i) acquire the classification value of the second log message determined based on the occurrence frequency of each word that forms the second log message, (j) acquire the occurrence frequency of a combination of the classification value of the first log message and the classification value of the second log message from classification value-occurrence frequency association information that is created based on the plurality of log messages contained in the log and stores the combination of the classification values of the log messages determined based on the occurrence frequency of each word that forms each of the log messages and the occurrence frequency of the combination with the combination and the occurrence frequency associated with each other, (k) calculate a second evaluation value that is an evaluation value representing a degree of occurrence of the combination of the classification value of the first log message and the classification value of the second log message based on the occurrence frequency of the combination acquired from the classification value-occurrence frequency association information, and (l) calculate a third evaluation value that is an evaluation value representing a degree of association between the first log message and the second log message based on the first evaluation value and the second evaluation value.

BRIEF DESCRIPTION OF THE DRAWINGS

FIGS. 4(A) and 4(B) show examples of a high occurrence frequency word and a low occurrence frequency word out of words that occur in a log message;

FIG. 5 shows an example of the configuration of a word-occurrence frequency associating management table;

FIG. 6 shows an example of the configuration of a log-word associating management table;

FIG. 17 is a flowchart showing an example of the process of displaying grouped log messages.

DETAILED DESCRIPTION OF THE EMBODIMENT

A log message grouping system according to an embodiment of the present invention will be described below with reference to the drawings.

Figure 1:
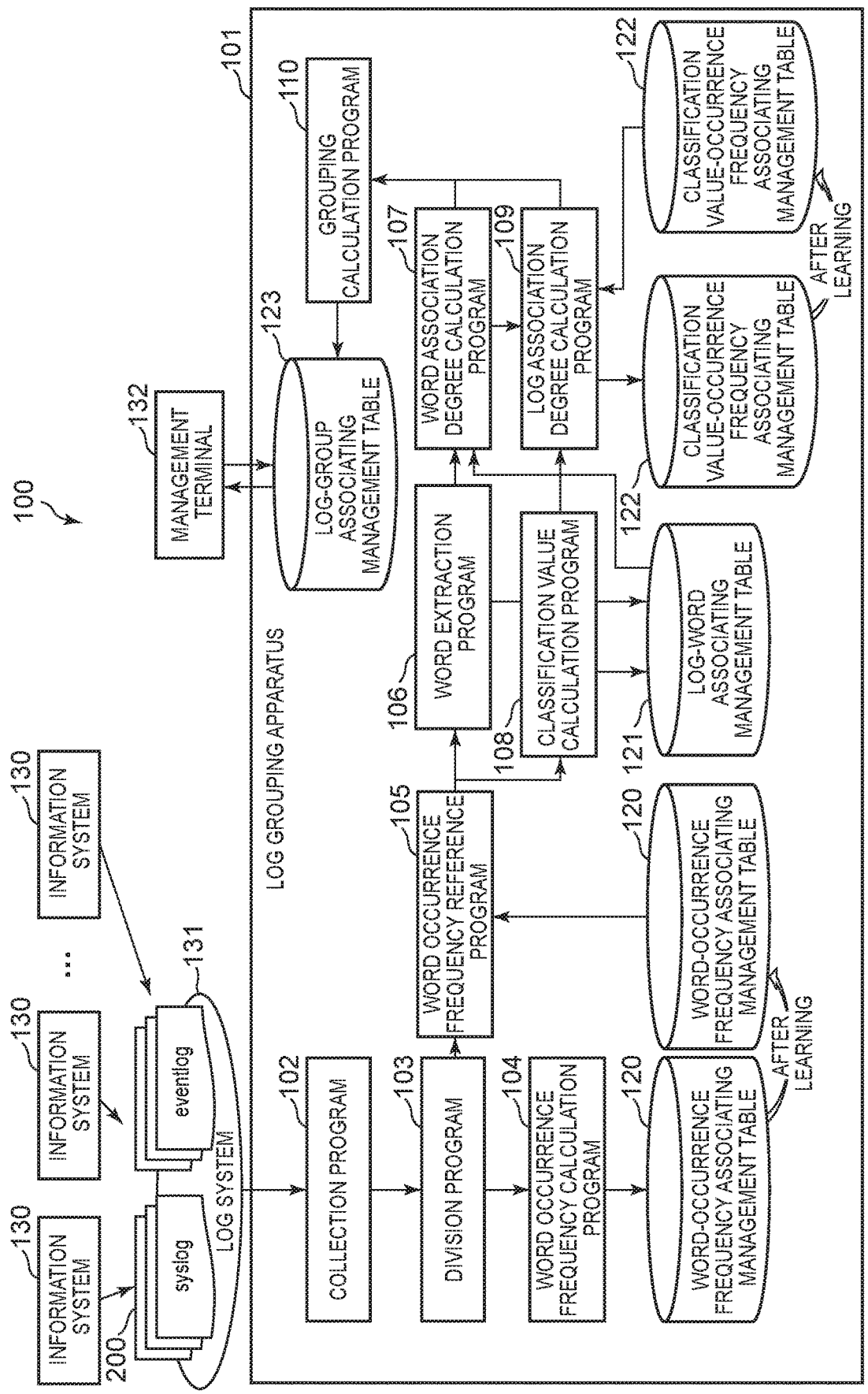
FIG. 1 shows an example of the configuration of a log message grouping system according to an embodiment of the present invention.
Figure 2:
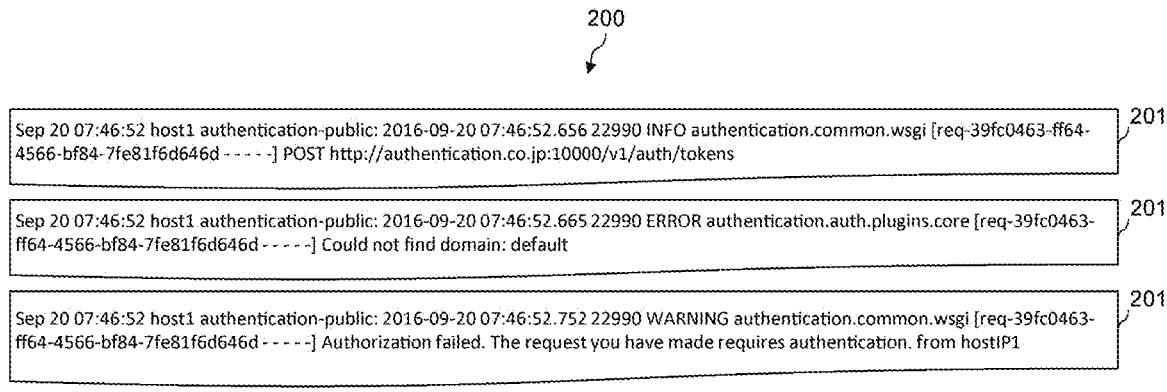
FIG. 2 shows an example of a log and log messages recorded in the log.

FIG. 1 is a descriptive diagram showing an example of the configuration of the log message grouping system according to the present embodiment. FIG. 2 shows an example of a log and log messages recorded in the log.

A log message grouping system 100 includes one or multiple information systems 130, each of which outputs logs 200, a log system 131, which compiles the logs 200 outputted by the information systems 130, a log message grouping apparatus 101, which collects the logs 200 from the log systems 131 and associates log messages 201 associated with one another as a group, and a management terminal 132, which acquires information on the log messages associated with one another as a group from the log message grouping apparatus 101.

The information systems 130 each execute one or multiple pieces of software on a computer to output one or multiple logs 200. The output format of the logs 200 may, for example, be a known log format, such as Syslog, or may be a proprietary log format.

The log system 131 compiles the logs 200 outputted by the information systems 130. The log system 131 is independent of the log message grouping apparatus 101 in the present embodiment but may instead be incorporated in the log message grouping apparatus 101. In a configuration in which the information systems 130 are each provided with the log message grouping apparatus 101 in a one-to-one relationship, the log system 131 may be omitted.

The management terminal 132 is coupled to the log message grouping apparatus 101. The management terminal 132 accepts information inputted from an operator and transmits the accepted information to the log message grouping apparatus 101. The management terminal 132 further acquires information from the log message grouping apparatus 101 and displays the acquired information. The management terminal 132 is independent of the log message grouping apparatus 101 in the present embodiment but may instead be incorporated in the log message grouping apparatus 101.

FIG. 2 shows an example of a log 200 and log messages recorded in the log 200. The log 200 is formed of one or more log messages 201, and the log messages 201 each contain at least one or more words. The word is, for example, a log level, a time point, a software name, or a specific identifier.

Figure 3:
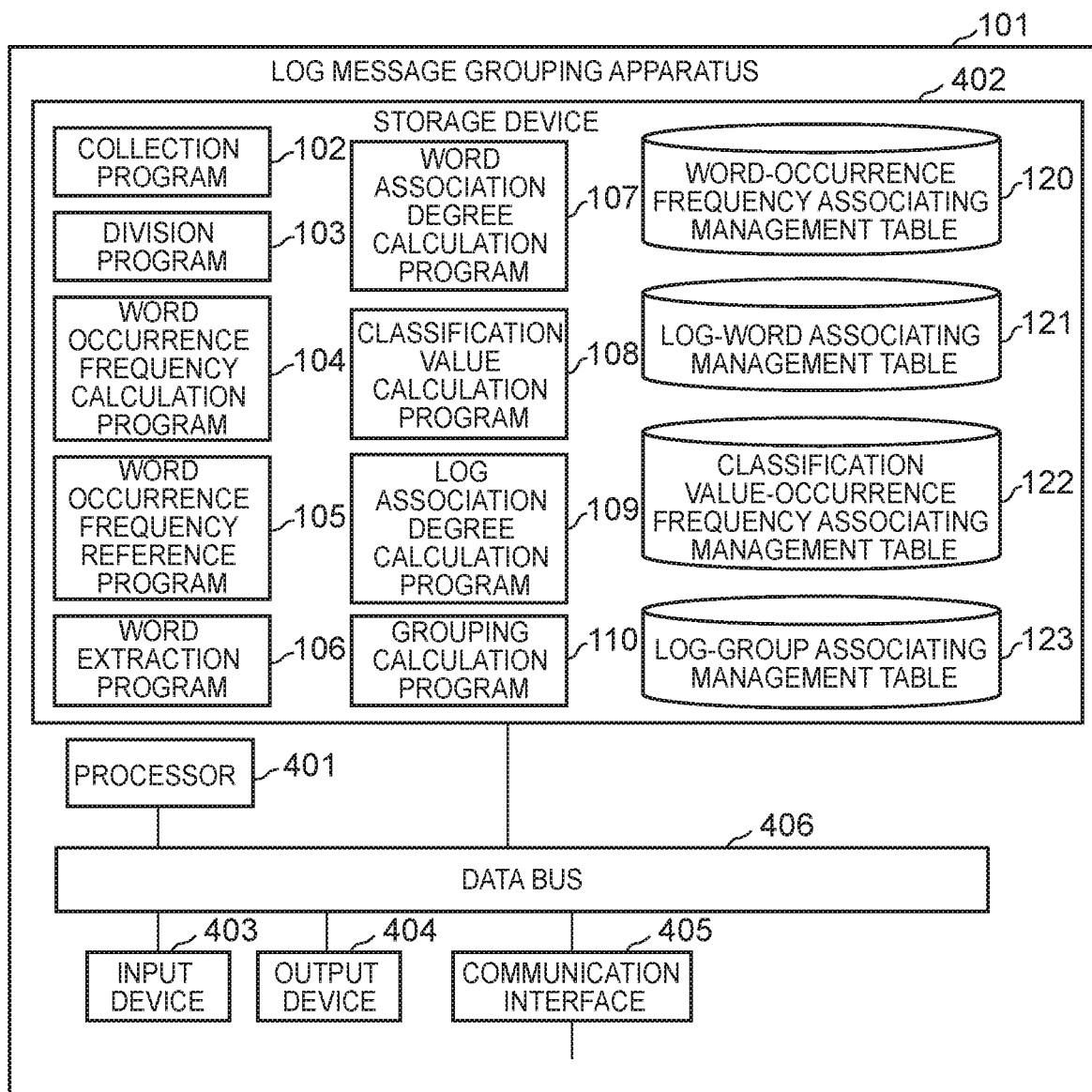
FIG. 3 is a block diagram showing an example of the hardware configuration of a log message grouping apparatus.

FIG. 3 is a block diagram showing an example of the hardware configuration of the log message grouping apparatus 101. In the present embodiment, the description will be made with reference to a case where the log message grouping apparatus 101 is a physical machine. The log message grouping apparatus 101 includes a processor 401, a storage device 402, an input device 403, an output device 404, and a communication interface 405. Each of the portions of the log message grouping apparatus 101 is coupled to each other via a data bus 406. The log message grouping apparatus 101 may be a virtual machine or software. The storage device 402 may instead be located on a network cloud.

The processor 401 controls the log message grouping apparatus 101.

The storage device 402 is formed, for example, of a ROM (read only memory), a RAM (random access memory), an HDD (hard disk drive), and a flash memory.

The storage device 402 stores the following programs executed by the processor 401: a collection program 102; a division program 103; a word occurrence frequency calculation program 104; a word occurrence frequency reference program 105; a word extraction program 106; a word association degree calculation program 107; a classification value calculation program 108; a log association degree calculation program 109; and a grouping calculation program 110.

The storage device 402 further stores a word-occurrence frequency associating management table 120, a log-word associating management table 121, a classification value-occurrence frequency associating management table 122, and a log-group associating management table 123.

The storage device 402 is a permanent or temporary storage medium and is also a work area used by the processor 401. The programs 102 to 110 described above may each be stored in advance in the storage device 402 or may be introduced from another storage device, an external storage apparatus, a network cloud as required.

The input device 403 is used to input information and is, for example, a keyboard, a mouse, a touch panel, a numeric keyboard, or a scanner. The output device 404 is, for example, a display that displays figures and a variety of pieces of data. The communication interface 405 transmits and receives data.

The processor 401 executes the programs 102 to 110 described above to achieve a variety of processes that will be described below by using the storage device 402 and the communication interface 405. In the following description, the description will be made on the assumption that the programs 102 to 110 described above are each an execution body. Part or entirety of the functions achieved when the processor 401 executes the programs 102 to 110 described above may be achieved by dedicated hardware.

The processor 401 executes the programs 102 to 110 described above to (a) collect logs 200 that each record a plurality of log messages 201, (b) acquire the plurality of log messages 201 from each of the logs 200, (c) acquire the occurrence frequency of each word that forms a log message 201 (first log message) from an after-learning word-occurrence frequency associating management table 120, which is created on the basis of the plurality of log messages 201 contained in the log 200 and stores each word contained in the plurality of log messages 201 and the occurrence frequency of the word with the word and the occurrence frequency associated with each other, (d) store, in the log-word associating management table 121, the log message 201 and a word that is one of the words that form the log message 201 and occurs by a frequency smaller than a predetermined occurrence frequency determination threshold with the log message 201 and the word as a minority word associated with each other, (e) acquire a minority word contained in a log message 201 (second log message) earlier than the log message 201 from the log-word associating management table 121, (f) calculate a coincidence degree evaluation value E1 representing the degree of coincidence between the minority word in the log message 201 and the minority word in the past log message 201, (g) calculate a classification value that is information that identifies the log message 201 and is determined on the basis of the occurrence frequency of each word that forms the log message 201, (h) store, in the log-word associating management table 121, the log message 201 and the classification value of the log message 201 with the log message 201 and the classification value associated with each other, (i) acquire, from the log-word associating management table 121, the classification value of the past log message 201 determined on the basis of the occurrence frequency of each word that forms the past log message 201, (j) acquire the occurrence frequency of the combination of the classification value of the log message 201 and the classification value of the past log message 201 from an after-learning classification value-occurrence frequency associating management table 122, which is created on the basis of the plurality of log messages 201 contained in the log 200 and stores the combination of the classification values of the log messages 201 determined on the basis of the occurrence frequency of each word that forms each of the log messages and the occurrence frequency of the combination with the combination and the occurrence frequency associated with each other, (k) calculate an occurrence degree evaluation value E2 representing the degree of occurrence of the combination of the classification value of the log message 201 and the classification value of the past log message 201 on the basis of the occurrence frequency of the combination of the classification values acquired from the classification value-occurrence frequency associating management table 122, (l) calculate an association degree evaluation value E3 representing the degree of association between the log message 201 and the past log message 201 on the basis of the coincidence degree evaluation value E1 and the occurrence degree evaluation value E2, (m) create the word-occurrence frequency associating management table 120, which stores each word contained in the plurality of log messages 201 and the occurrence frequency of the word with the word and the occurrence frequency associated with each other, (n) create the classification value-occurrence frequency associating management table 122, which stores the combination of the classification value of the log message 201 and the classification value of the past log message 201 and the occurrence frequency of the combination with the combination and the occurrence frequency associated with each other, (o) store, in the log-group associating management table 123, the log message 201 and the past log message 201 with the log message 201 and the past log message 201 associated with each other as a group on the basis of any of the coincidence degree evaluation value E1, the occurrence degree evaluation value E2, and the association degree evaluation value E3, (p) upon acceptance of a request message that requests information on log messages 201 associated with each other as a group, acquire a log message 201 different from but associated as a group with a log message 201 contained in the request from the log-group associating management table 123 and output a response message containing the different log message 201 in response to the request message, and (p') acquire a log message different from but associated with as a group the log message contained in the request and satisfying any of the evaluation values from the log-group associating management table 123 and output a response message containing the different log message in response to the request message.

The programs 102 to 110 described above will next be described.

The collection program 102 collects logs 200, which are compiled by the log system 131 and each have recorded log messages. The collection program 102 transfers the collected logs 200 to the division program 103. The method for collecting logs 200 may be a method for causing the collection program 102 to receive logs 200 from the log system 131 or a method for causing the log system 131 to transfer logs 200 to the collection program 102. Instead, in a configuration without the log system 131, logs 200 may be directly received or transferred from the information systems 130.

The division program 103 accepts the logs 200 from the collection program 102. The division program 103 acquires log messages 201 to be processed in the order of recorded time points from each of the logs 200 and divides each of the log messages 201 into words that form the log message 201 on the basis of a division rule. The division rule is, for example, a rule to divide a log message 201 into words by using a space contained in the log message 201 as a delimiter or a rule to divide a log message 201 into words by using a comma contained in the log message 201 as a delimiter. The division rule may be configured in advance in the division program 103 or may be inputted by the operator. The division program 103 transfers the log message 201 and a list of words that form the log message 201 to the word occurrence frequency calculation program 104 and the word occurrence frequency reference program 105.

The word occurrence frequency calculation program 104 accepts the list of the words that form the log message 201 being processed from the division program 103. The word occurrence frequency calculation program 104 uses each word contained in the word list as a search key to search the word-occurrence frequency associating management table 120 (FIG. 5) that is in the course of creation. The word occurrence frequency calculation program 104, when it finds a record that stores the word as a result of the search, adds 1 to the occurrence frequency of the word to update the word-occurrence frequency associating management table 120, whereas the word occurrence frequency calculation program 104, when it finds no record that stores the word as a result of the search, adds a new record that stores the word (that is, updates word-occurrence frequency associating management table 120) and configures the occurrence frequency at 1. Further, the word occurrence frequency calculation program 104 stores the date when the record is updated as a registration date. The word occurrence frequency calculation program 104 repeats the process described above to create the word-occurrence frequency associating management table 120 that stores a word contained in a log 200 and the occurrence frequency of the word with the word and the occurrence frequency associated with each other, and when the process described above is completed in relation to the collected logs 200, the after-learning word-occurrence frequency associating management table 120 is completed. The after-learning word-occurrence frequency associating management table 120 is created on the basis of past logs 200 before the log 200 collected by the collection program 102 described above and currently being processed. As a result, the word-occurrence frequency associating management table 120 that stores each word contained in the logs 200 and the occurrence frequency of the word with the word and the occurrence frequency associated with each other can be created with log messages 201 associated with one another as a group, whereby the efficiency of the process can be increased.

The word occurrence frequency calculation program 104 may create the word-occurrence frequency associating management table 120 on the basis, for example, on log messages 201 recorded in a log 200 in a calculation period specified by the operator (such as preceding day or within past one week). Instead, the word occurrence frequency calculation program 104 may continuously create the word-occurrence frequency associating management table 120, extract only records in which a registration date that falls within a reference period specified by the operator is configured from the word-occurrence frequency associating management table 120, and duplicate the records to create an after-leaning word-occurrence frequency associating management table.

The word occurrence frequency reference program 105 accepts the log message 201 being processed and the list of the words that form the log message 201 from the division program 103. The word occurrence frequency reference program 105 acquires the occurrence frequency of each of the words contained in the word list from the after-learning word-occurrence frequency associating management table 120. In a case where no record of the word is present in the word-occurrence frequency associating management table 120, the occurrence frequency of the word is configured to be 0. The word occurrence frequency reference program 105 then links each of the words contained in the word list to the occurrence frequency of the word and transfers the word and the occurrence frequency thereof along with the log message 201 to the word extraction program 106 and the classification value calculation program 108.

The word extraction program 106 accepts the log message 201 being processed and a list of the words to each of which the occurrence frequency is linked from the word occurrence frequency reference program 105. The word extraction program 106 extracts minority words that are words the occurrence frequency of each of which is smaller than the occurrence frequency determination threshold from the word list to create a minority word list. In the process described above, one or multiple minority words are extracted. The occurrence frequency determination threshold may be a value configured by the operator or a value determined by using a proprietary method, such as a method using a deviation or an occurrence probability of the occurrence frequency. Having created the minority word list in relation to the log message 201, the word extraction program 106 adds a new record that stores the time point when the log message 201 occurred, the log message 201, and the list of the minority words in the log message 201 with the three pieces of information associated with one another to the log-word associating management table 121 (FIG. 6).

FIGS. 4(A) and 4(B) show examples of a relatively high occurrence frequency word 300 and examples of a relatively low occurrence frequency word 310 out of the words contained in the log message 201. The relatively high occurrence frequency word includes the log level (such as INFO, WARNING, and ERROR), a software name (authentication), the date (2016-09-21, Sep 20), and other words. The relatively low occurrence frequency word includes a request ID, a user ID, an instance ID, and other words. The examples of the high occurrence frequency word 300 and the examples of the low occurrence frequency word 310 shown in FIGS. 4(A) and 4(B) are presented by way of example and are not intended to limit the configuration or effect of the present embodiment.

Further, the word extraction program 106 acquires, from the log-word associating management table 121, one or multiple past log messages 201 that have been recorded before the log message 201 being processed and have occurred at time points that fall within an acquisition target period, a list of minority words in the past log messages 201, and the classification value (which will be described later) of each of the minority words. The acquisition target period may be a period specified by the operator, a period configured in advance, or a period determined by using a proprietary method. The acquisition target period is, for example, the period after one hour before (that is, from one hour before to the present). The word extraction program 106 transfers the log message 201 being processed, the list of minority words in the log message 201, the past log messages 201 acquired from the log-word associating management table 121, the list of the minority words in the past log messages 201, and the classification values of the past log messages 201 to the word association degree calculation program 107.

The word association degree calculation program 107 accepts the log message 201 being processed, the list of the minority words in the log message 201, the past log messages 201, the list of the minority words in the past log messages 201, and the classification values of the past log messages 201 from the word extraction program 106. The word association degree calculation program 107 determines whether or not the minority words in the log message 201 being processed coincide with the minority words in each of the past log messages 201. In this process, the log message 201 being processed is compared with each of the past log messages 201 in a one-to-one relationship. For example, the word association degree calculation program 107, when it accepts 50 past log messages 201 from the word extraction program 106, compares the log message 201 being processed (first log message) with each of the 50 past log messages 201 (second log messages) and determines the result of the comparison. The word association degree calculation program 107 calculates the coincidence degree evaluation value E1, which represents the degree of coincidence, on the basis of the number of minority words coincident with each other and the number of minority words compared with each other. In the example described above, 50 coincidence degree evaluation values E1 are therefore calculated. The coincidence degree evaluation value E1 is an index representing the degree of coincidence between a minority word in a log message and a minority word in another log message.

In the present embodiment, for example, in a case where the number of minority words in the log message 201 being processed is 3 and the number of minority words in a past log message 201 is 3, and in a case where all the minority words coincide with each other, the coincidence degree evaluation value E1 is 1 (=3/3). In a case where the number of minority words in the log message 201 being processed is 3 and the number of minority words in a past log message 201 is 5, and in a case where two of the minority words coincide with each other, the coincidence degree evaluation value E1 is 0.4 (=2/5). In a case where the number of minority words in the log message 201 being processed is 6 and the number of minority words in a past log message 201 is 4, and in a case where three of the minority words coincide with each other, the coincidence degree evaluation value E1 is 0.5 (=3/6). That is, the denominator is the greater number of minority words in the two log messages 201 compared with each other. The aforementioned method for calculating the coincidence degree evaluation value E1 is presented by way of example and is not intended to limit the configuration or effect of the present embodiment. An arbitrary method for calculating the coincidence degree evaluation value E1 between minority words may be employed as long as the method does not depart from the purpose of the present invention.

The word association degree calculation program 107 transfers the log message 201 being processed, the past log messages 201 compared with the log message 201 being processed, and the coincidence degree evaluation value E1 calculated in relation to the log message 201 being processed and each of the past log messages 201 to the grouping calculation program 110. The word association degree calculation program 107 further transfers the combination of the log message 201 being processed and each of the past log messages 201 in relation to which the coincidence degree evaluation value E1 has been calculated, the past log messages 201, and the classification values thereof to the log association degree calculation program 109.

The classification value calculation program 108 accepts the log message 201 being processed and the list of words to each of which the occurrence frequency is linked from the word occurrence frequency reference program 105. The classification value calculation program 108 calculates the classification value on the basis of the occurrence frequency of a word. The classification value is a value for classifying a log message 201 on the basis of the occurrence frequency of each word that forms the log message 201 and can be handled as information for identifying the log message 201. It is believed that log messages 201 having closer classification values have more similar configurations. In the present embodiment, the sum of the occurrence frequencies of the words in the log message 201 being processed is calculated, and the result of the calculation is used as the classification value. The classification value calculation program 108 associates a log message 201 with the calculated classification value of the log message 201 and stores them in the log-word associating management table 121. Instead, the log message 201 and the classification value thereof may be associated with each other and stored in a management table different from the log-word associating management table 121. Further, the classification value calculation program 108 transfers the log message 201 and the classification value thereof to the log association degree calculation program 109.

Figure 7:
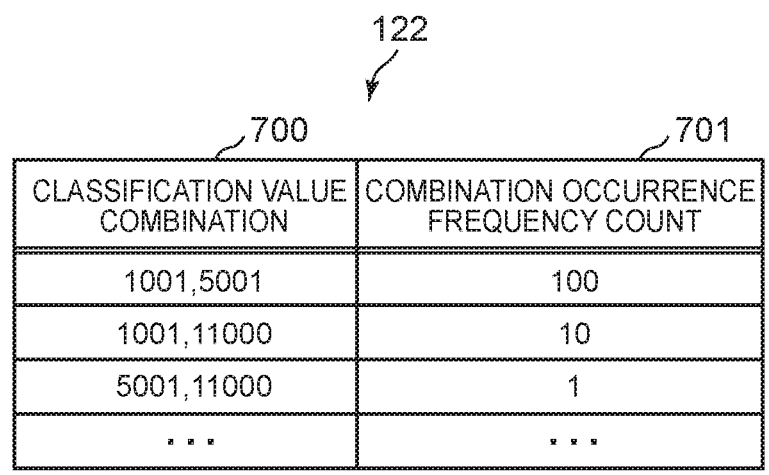
FIG. 7 shows an example of the configuration of a classification value-occurrence frequency associating management table.

The log association degree calculation program 109 accepts the log message 201 being processed and the classification value thereof from the classification value calculation program 108. The log association degree calculation program 109 further accepts the past log messages 201 in relation to each of which the coincidence degree evaluation value E1 has been calculated and the classification values of the past log messages 201 from the word association degree calculation program 107. The log association degree calculation program 109 uses the combination of the classification value of the log message 201 being processed and the classification value of each of the past log messages 201 as a search key to search the classification value-occurrence frequency associating management table 122 (FIG. 7). The log association degree calculation program 109, when it finds a record that stores the combination of the two types of classification value as a result of the search, may add 1 to the occurrence frequency of the classification values to update the classification value-occurrence frequency associating management table 122, whereas the log association degree calculation program 109, when it finds no record that stores the combination of the two types of classification value, may add a new record that stores the combination and configure the occurrence frequency at 1. The log association degree calculation program 109 repeats the process described above to create the classification value-occurrence frequency associating management table 122 that stores the combination of the classification value of the log message 201 being processed and the classification value of each of the past log messages 201 and the occurrence frequency of the combination with the combination and the occurrence frequency associated with each other, and after the process described above is completed in relation to a collected log 200, an after-learning classification value-occurrence frequency associating management table 122 is completed. The after-learning classification value-occurrence frequency associating management table 122 is created on the basis of past logs 200 before a log 200 collected by the collection program 102 described above and currently being processed. The classification value-occurrence frequency associating management table 122 that stores the combination of the classification value of the log message 201 being processed and the classification value of each of the past log messages 201 and the occurrence frequency of the combination with the combination and the occurrence frequency associated with each other can thus be created with the log messages 201 associated with one another as a group, whereby the efficiency of the process can be increased. On the other hand, the classification value-occurrence frequency associating management table 122 may undergo learning in advance by using a past log 200, as in the case of the word-occurrence frequency associating management table 120. The log association degree calculation program 109 may use the after-learning classification value-occurrence frequency associating management table 122 to acquire the occurrence frequency of the combination of the two types of classification value.

Further, the log association degree calculation program 109 acquires the occurrence frequency of the combination of the classification value of the log message 201 being processed (first log message) and the classification value of each of the past log messages 201 (second log messages) from the classification value-occurrence frequency associating management table 122. The log association degree calculation program 109 calculates the occurrence degree evaluation value E2 on the basis of the acquired occurrence frequency of the combination of the classification values. That is, the occurrence degree evaluation value E2 is calculated in relation to the past log messages 201 in relation to each of which and the log message 201 being processed the coincidence degree evaluation value E1 has been calculated.

The occurrence degree evaluation value E2 is an evaluation value representing the degree of occurrence of a combination of log messages 201 and calculated by using the following expression in the present embodiment:

$$E2=1-\exp(-x/\sigma)$$

In the expression, x represents the occurrence frequency of the combination of classification values, and $\sigma$ is a constant. The constant $\sigma$ may, for example, be a value configured by the operator or a value determined by using a proprietary method, such as a method using a deviation or an occurrence probability of the occurrence frequency. The aforementioned method for calculating the occurrence degree evaluation value E2 is presented by way of example and is not intended to limit the configuration or effect of the present embodiment. An arbitrary method for calculating the occurrence degree evaluation value E2 representing the degree of occurrence of the combination of classification values may be employed as long as the method does not depart from the purpose of the present invention. The occurrence degree evaluation value E2 has a meaning as a value that weighs the coincidence degree evaluation value E1. Specifically, a combination of classification values that has an occurrence frequency extremely smaller than the constant $\sigma$, that is, a combination of log messages that rarely occurs is handled as a combination having low importance, and the occurrence degree evaluation value E2 as the weight is configured to be a small value.

The log association degree calculation program 109 transfers the log message 201 being processed, the past log messages 201 compared with the log message 201 being processed, and the occurrence degree evaluation value E2 of the two types of log message 201 to the grouping calculation program 110.

Figure 8:
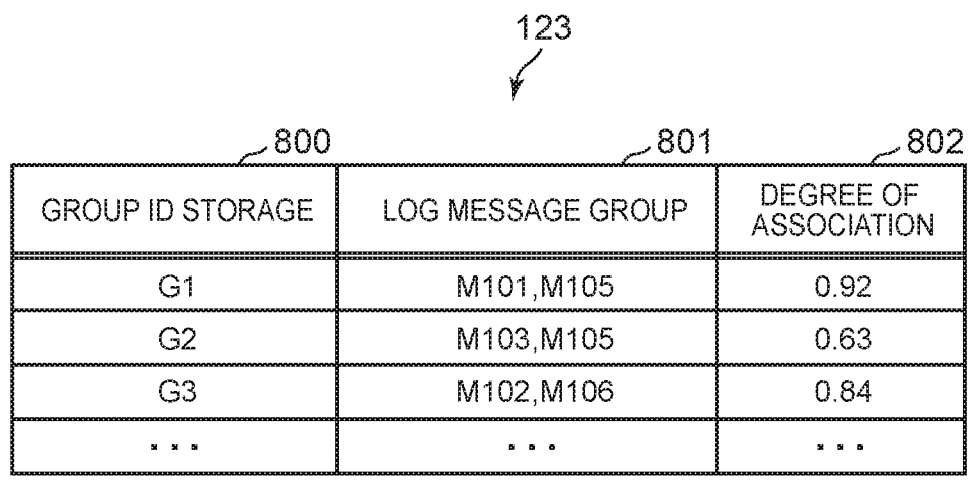
FIG. 8 shows an example of the configuration of a log-group associating management table.

The grouping calculation program 110 accepts the log message 201 being processed, the past log messages 201, and the coincidence degree evaluation value E1 between the two types of log message from the word association degree calculation program 107. The grouping calculation program 110 further accepts the log message 201 being processed, the past log messages 201, and the occurrence degree evaluation value E2 of the two types of log messages 201 from the log association degree calculation program 109. The grouping calculation program 110 then multiplies the coincidence degree evaluation value E1 by the occurrence degree evaluation value E2 for each of the past log messages 201 to calculate the association degree evaluation value E3. The grouping calculation program 110 handles the log message 201 being processed and the past log messages 201 that correspond to the association degree evaluation value E3 as one group and creates a group ID that uniquely identifies the group. The grouping calculation program 110 adds a new record that stores the group ID, the two log messages 201 from which the association degree evaluation value E3 has been calculated, and the association degree evaluation value E3 with the three pieces of information associated with one another to the log-group associating management table 123 (FIG. 8). In a case where a plurality of past log messages 201 are present in relation to the log message 201 being processed, only the combinations of a predetermined number of log messages 201 having relatively high association degree evaluation values E3 may each be added as the record to the log-group associating management table 123. Log messages 201 can thus be associated with one another as a group with higher accuracy.

The management tables 120 to 123 will next be described with reference to FIGS. 5 to 8.

FIG. 5 shows an example of the configuration of the word-occurrence frequency associating management table 120 as word-occurrence frequency associating information. The word-occurrence frequency associating management table 120 is management information containing one or multiple records each containing a registration date 500, a word 501, and a word occurrence frequency count 502. The word-occurrence frequency associating management table 120 is successively updated by the word occurrence frequency calculation program 104 whenever the log message grouping apparatus 101 accepts a log 200. The word-occurrence frequency associating management table 120 may be created from scratch for a calculation period specified by the operator. The word-occurrence frequency associating management table 120 may instead be continuously created, and only a record that stores a registration date that falls within a reference period specified by the operator may be extracted and duplicated to create an after-learning word-occurrence frequency associating management table 120.

As a value of the registration date 500, the date when a record is newly created or the date when a record is updated is stored. The registration date 500 is used by the word occurrence frequency reference program 105 when the reference period is specified, and the column of the registration date 500 is not required in a configuration in which the word-occurrence frequency associating management table 120 is created with the calculation period specified in advance. As a value of the word 501, a word contained in a log message 201 recorded in a log 200 is stored. As a value of the word occurrence frequency count 502, the frequency of the word that occurs in a predetermined period (calculation period described above, for example) is stored. The word occurrence frequency reference program 105 can thus acquire information on the frequency of the word stored in the word 501 occurs in the log 200 during the predetermined period.

FIG. 6 shows an example of the configuration of the log-word associating management table 121 as log-word association information. The log-word associating management table 121 is management information containing one or multiple records each containing occurrence time point 600, a log message storage 601, a classification value storage 602, and a minority word list 603. The log-word associating management table 121 is successively updated by the word extraction program 106 and the classification value calculation program 108 whenever the log message grouping apparatus 101 accepts a log 200. In the log-word associating management table 121, the word extraction program 106 stores values in the columns of the occurrence time point 600, the log message storage 601, and the minority word list 603, and the classification value calculation program 108 stores a value in the column of the classification value storage 602.

As a value of the occurrence time point 600, the time point when a log message 201 occurs is stored. As a value in the log message storage 601, the log message 201 is stored. As a value in the classification value storage 602, a classification value calculated by the classification value calculation program 108 is stored. As a value in the minority word list 603, a list of minority words that are words having been determined that the occurrence frequencies thereof in the log message 201 stored in the log message storage 601 (smaller than occurrence frequency determination threshold) is stored. A list of minority words in each of the past log messages 201 recorded before the log message 201 being processed and the classification values of the past log messages 201 can thus be acquired.

FIG. 7 shows an example of the configuration of the classification value-occurrence frequency associating management table 122 as classification value-occurrence frequency association information. The classification value-occurrence frequency associating management table 122 is management information containing one or multiple records each containing a classification value combination 700 and a combination occurrence frequency count 701. The classification value-occurrence frequency associating management table 122 is successively updated by the log association degree calculation program 109 whenever the log message grouping apparatus 101 accepts a log 200. In the classification value-occurrence frequency associating management table 122, the log association degree calculation program 109 stores values in the classification value combination 700 and the combination occurrence frequency count 701.

As a value of the classification value combination 700, the combination of the classification values of two log messages 201, the log message 201 being processed and a past log message 201, is stored. As a value of the combination occurrence frequency count 701, the occurrence frequency of the combination of the classification values of the two log messages 201 stored in the classification value combination 700 is stored. The occurrence frequency of the combination of the classification value of the log message 201 being processed and the classification value of the past log message 201 can thus be acquired.

FIG. 8 shows an example of the configuration of the log-group associating management table 123, which is log-group association information. The log-group associating management table 123 is management information containing one or multiple records each containing a group ID storage 800, a log message group 801, and the degree of association 802. The log-group associating management table 123 is successively updated by the grouping calculation program 110. In the log-group associating management table 123, the grouping calculation program 110 stores values in the columns of the group ID storage 800, the log message group 801, and the degree of association 802.

As a value of the group ID storage 800, a group ID having a unique value different from other values of different group IDs is stored. The group ID is produced by the grouping calculation program 110. As a value of the log message group 801, two log messages 201 associated with each other as a group is stored. As a value of the degree of association 802, the association degree evaluation value E3 calculated by the grouping calculation program 110 is stored. The operator can therefore acquire log messages 201 highly associated with each other. The coincidence degree evaluation value E1 or the occurrence degree evaluation value E2 may instead be stored in the degree of association 802.

In the above description, each piece of information has been described in the form of an "xxx table," but information may be expressed in any data structure. That is, to indicate that information is independent of a data structure, the "xxx table" can be called "xxx information." Further, the configuration of each table in the above description is presented by way of example; one table may be divided into two or more tables, and the entirety or part of two or more tables may be one table.

Figure 9:
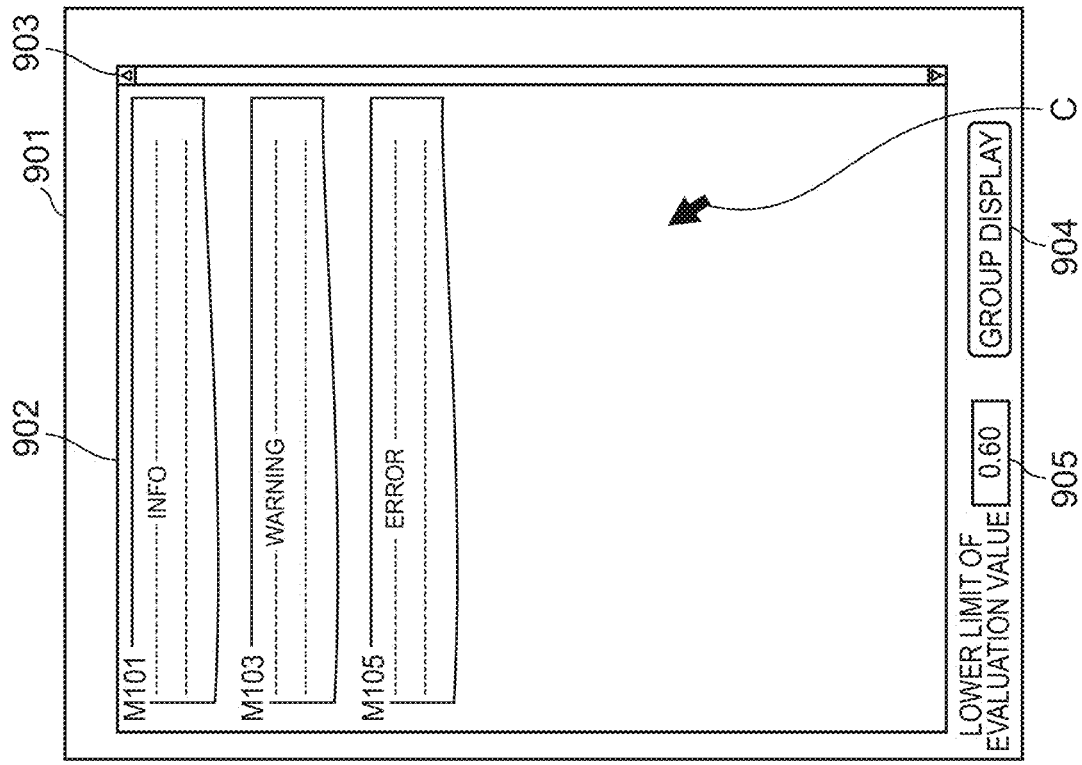
FIGS. 9(A) and 9(B) show examples of a displayed screen of a management terminal of the log message grouping system.
Figure 9:
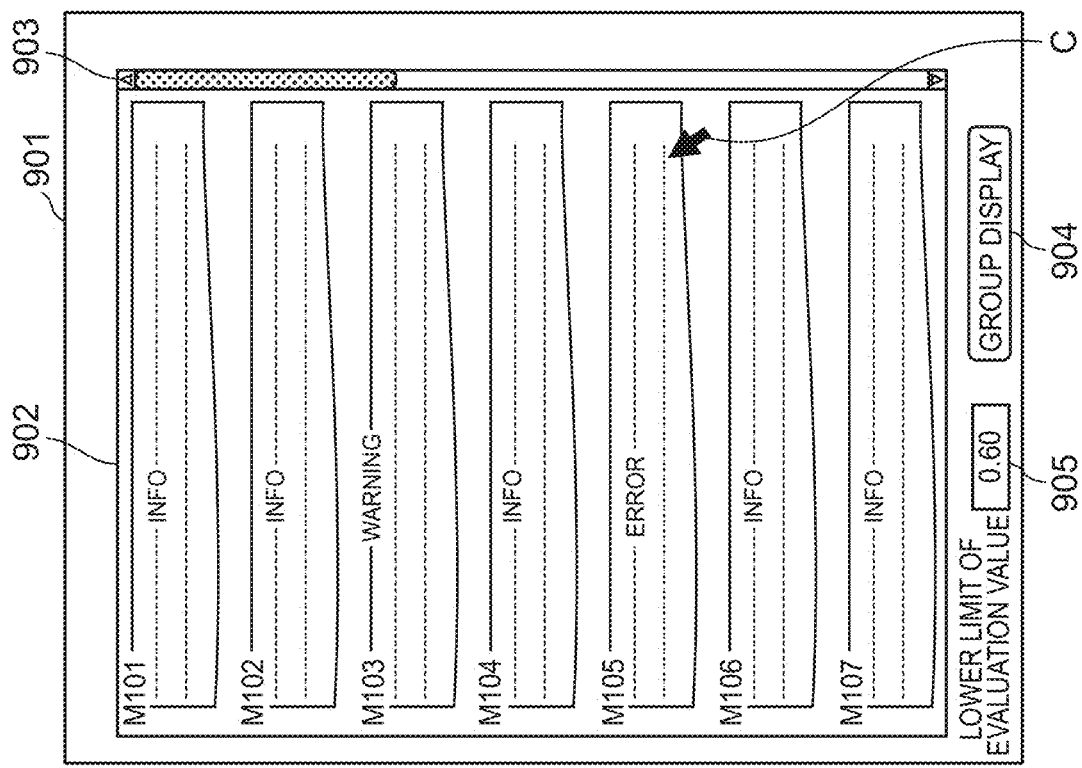

FIGS. 9(A) and 9(B) show examples of a displayed screen of the management terminal 132. FIG. 9(A) shows a state in which log messages before the grouping are displayed, and FIG. 9(B) shows a state in which the log messages after the grouping are displayed. The management terminal 132 has a screen 901, which includes a log message display area 902, a scroll bar 903 for scrolling log messages M101, M102, . . . displayed in the log message display area 902, an input box 905, into which a lower limit of the association degree evaluation value E3 (that is, condition of evaluation value) is inputted, and a group display button 904, which instructs start of the process of displaying the log messages after the grouping. The input box 905 may be omitted, or a lower limit of the coincidence degree evaluation value E1 or the occurrence degree evaluation value E2 may instead be inputted into the input box 905. A cursor C operated by a mouse that is not shown is shown on the screen 901, and the cursor C is operated to select any of the log messages M101, M102, . . . displayed in the log message display area 902, move a point of interest to the input box 905, press the group display button 904, and perform other types of operation. The displayed screens in FIGS. 9(A) and 9(B) are presented by way of example and are not intended to limit the configuration or effect of the present embodiment.

Figure 10:
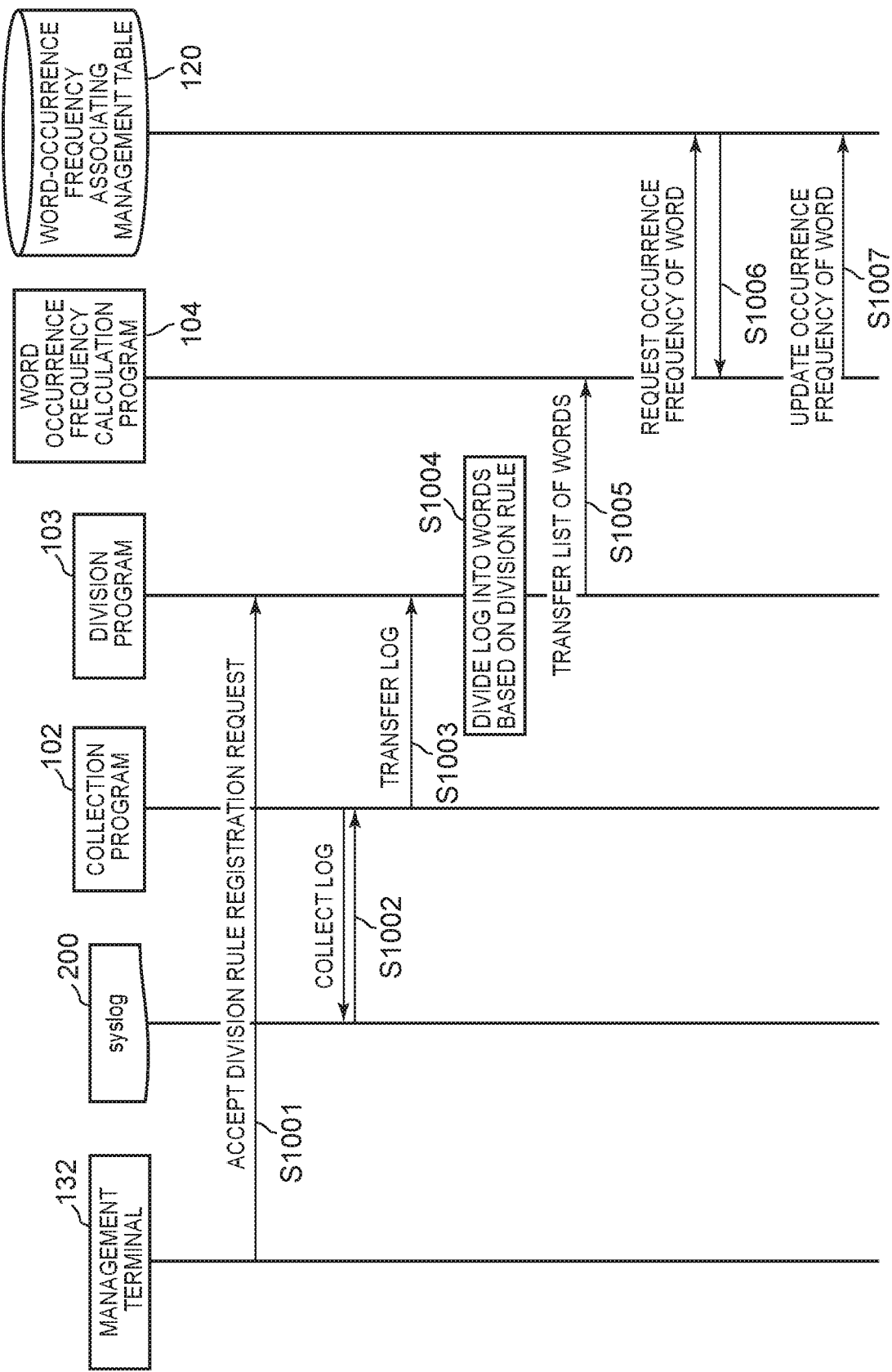
FIG. 10 is a sequence diagram showing an example of the process of calculating the occurrence frequency of a word.

The process of calculating the occurrence frequency of a word will next be described with reference to FIG. 10. FIG. 10 is a sequence diagram showing an example of the process of calculating the occurrence frequency of a word.

In the present embodiment, the management terminal 132 transmits a request message to the log message grouping apparatus 101 in accordance with operation performed via a CLI (command line interface) or a GUI (graphical user interface). The protocol used in the transmission may be SSH (Secure Shell), HTTP (Hypertext Transfer Protocol), or any other known or proprietary method. A response message transmitted from the log message grouping apparatus 101 to the management terminal 132 in response to the request message described above is processed in the management terminal 132, and a result of the process is displayed, for example, via the GUI. The management terminal 132 may be part of the log message grouping apparatus 101.

At the time of construction of the log message grouping system 100, when the division program 103 accepts a division rule registration request from the management terminal 132 operated by the operator (S1001), the division program 103 divides a log message 201 on the basis of the division rule. The division rule is, for example, a rule to "divide a log message into words by using a space as a delimiter." As the division rule, a division rule common to the information systems 130 may be defined, or a division rule according to each of the information systems 130 may be defined. The division rule may be changed after the log message grouping system 100 is constructed.

Thereafter, when the collection program 102 accepts a log 200, such as Syslog (S1002), the collection program 102 transfers the log 200 to the division program 103 (S1003). Having accepted the log 200 from the collection program 102, the division program 103 divides the log into words on the basis of the division rule registered in step S1001 (S1004). The log is therefore divided into one or more words. The division program 103 transfers a list of the divided words to the word occurrence frequency calculation program 104 (S1005). Having accepted the list of the words, the word occurrence frequency calculation program 104 refers to the word-occurrence frequency associating management table 120 and updates the occurrence frequency of each of the words contained in the word list. The word occurrence frequency calculation program 104 repeats steps S1006 to S1007 by the same number as the number of words accepted in step S1005.

Figure 11:
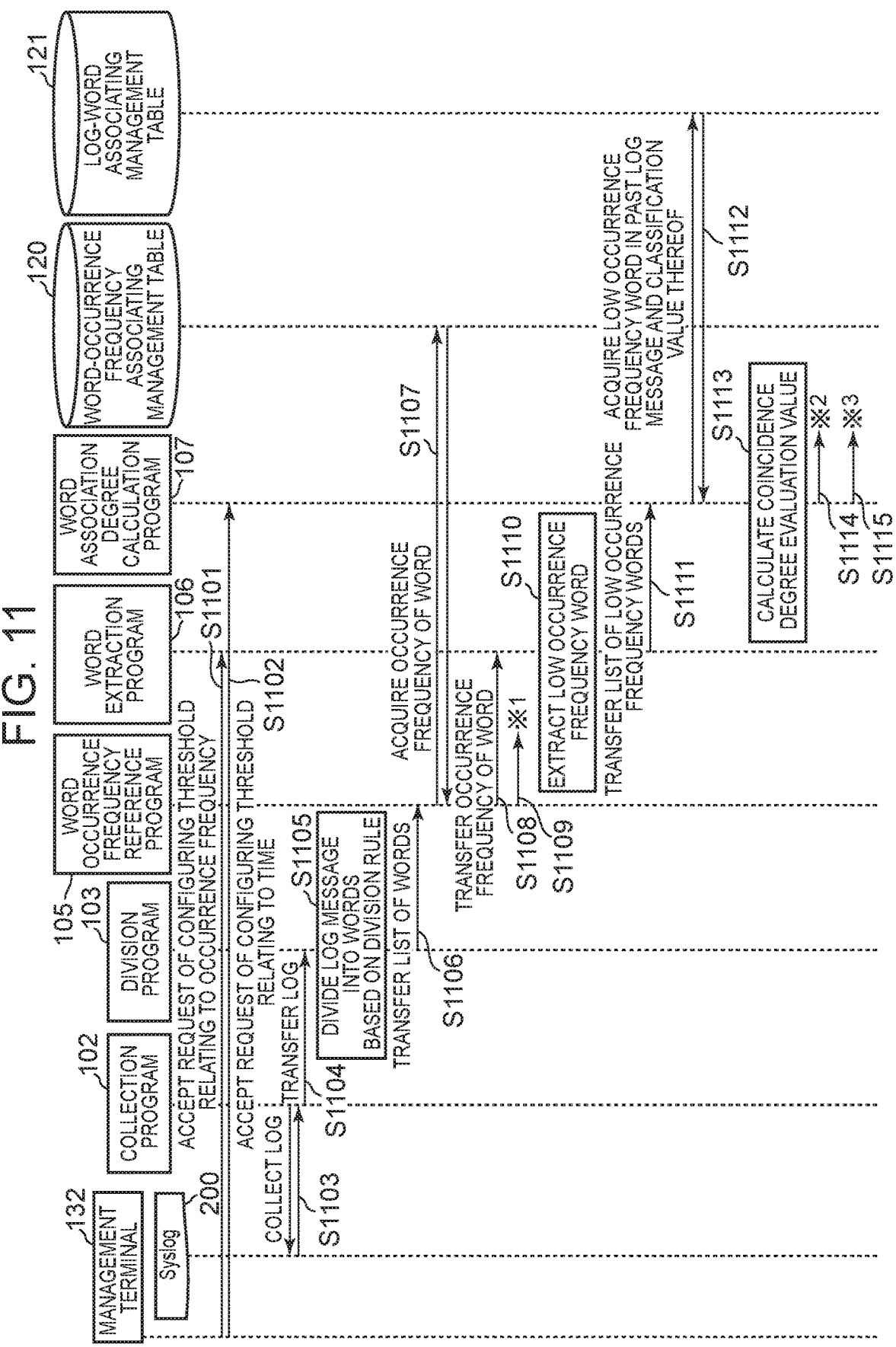
FIG. 11 is a sequence diagram showing an example of the process of calculating a coincidence degree evaluation value.

The process of calculating the coincidence degree evaluation value E1 will next be described with reference to FIG. 11. FIG. 11 is a sequence diagram showing an example of the process of calculating the coincidence degree evaluation value E1.

At the time when the log message grouping system 100 or after start of operation thereof, when the word extraction program 106 accepts a threshold relating to the occurrence frequency (occurrence frequency determination threshold) from the management terminal 132 operated by the operator (S1101), the word extraction program 106 carries out the process by using the occurrence frequency determination threshold accepted in step S1101. The occurrence frequency determination threshold is used as a determination reference in accordance, for example, with which "a word that occurs by a frequency that is 100 or smaller is assumed to be a low occurrence frequency word (minority word)." The occurrence frequency determination threshold is specified by the operator in the present embodiment but may instead be configured by using a proprietary method. As the occurrence frequency determination threshold, a value common to the information systems 130 may be configured, or a value according to each of the information systems 130 may be configured. The occurrence frequency determination threshold may be changed after the start of the operation of the log message grouping system 100.

The word association degree calculation program 107 accepts a threshold (process target period) relating to time from the management terminal 132 operated by the operator (S1102). The process target period is used, for example, as a target period for "configuring past log messages recorded before the time point when the log message currently being processed to be targets from which the evaluation values are calculated (that is, targets to be associated with the log message being processed as a group)." The word extraction program 106 acquires past log messages that occur when the occurrence time points thereof fall within the process target period from the log-word associating management table 121. The process target period is specified by the operator in the present embodiment but may instead be configured by using a proprietary method. As the process target period, a value common to the information systems 130 may be configured, or a value according to each of the information systems 130 may be configured. The process target period may be changed after the start of the operation of the log message grouping system 100.

The collection program 102 then collects a log 200, such as Syslog (S1103) and transfers the log 200 to the division program 103 (S1104). Having accepted the log 200 from the collection program 102, the division program 103 successively acquires process-target log messages 201 recorded in the log 200, divides each of the log messages 201 into words on the basis of the division rule registered in step S1001 (S1105), and transfers a list of the words to the word occurrence frequency reference program 105 (S1106). Having accepted the log messages 201 to be processed and a list of the words from the division program 103, the word occurrence frequency reference program 105 acquires the occurrence frequency of a word contained in the word list from the after-learning word-occurrence frequency associating management table 120 (S1107), links the occurrence frequency to the word, and transfers the log message 201 and the word to which the occurrence frequency has been linked to the word extraction program 106 and the classification value calculation program 108 (S1108, S1109). Step S1109 will be described later.

Having accepted the log messages 201 being processed and the list of the words to each of which the occurrence frequency has been linked, the word extraction program 106 extracts a minority word, which is a low occurrence frequency word, on the basis of the threshold configured in step S1101 (occurrence frequency determination threshold) (S1110). The word extraction program 106 transfers the log message 201 and the list of the minority words to the word association degree calculation program 107 (S1111). The word association degree calculation program 107 acquires past log messages 201 having occurred in the threshold (process target period) registered in step S1102, a list of minority words in the past log messages 201, and the classification values thereof from the log-word associating management table 121 (S1112).

The word association degree calculation program 107 calculates the coincidence degree evaluation value E1 from the list of the minority words in the process-target log message 201 acquired in step S1111 and the list of the minority words in each of the past log messages 201 acquired in step S1112 (S1113). The word association degree calculation program 107 transfers the log message 201 being processed, the past log messages 201, and the coincidence degree evaluation value E1 of the log messages 201 to the grouping calculation program 110 (S1114). Further, the word association degree calculation program 107 transfers the log messages 201 being processed, the past log messages 201, and the classification values thereof to the log association degree calculation program 109 (S1115).

Figure 12:
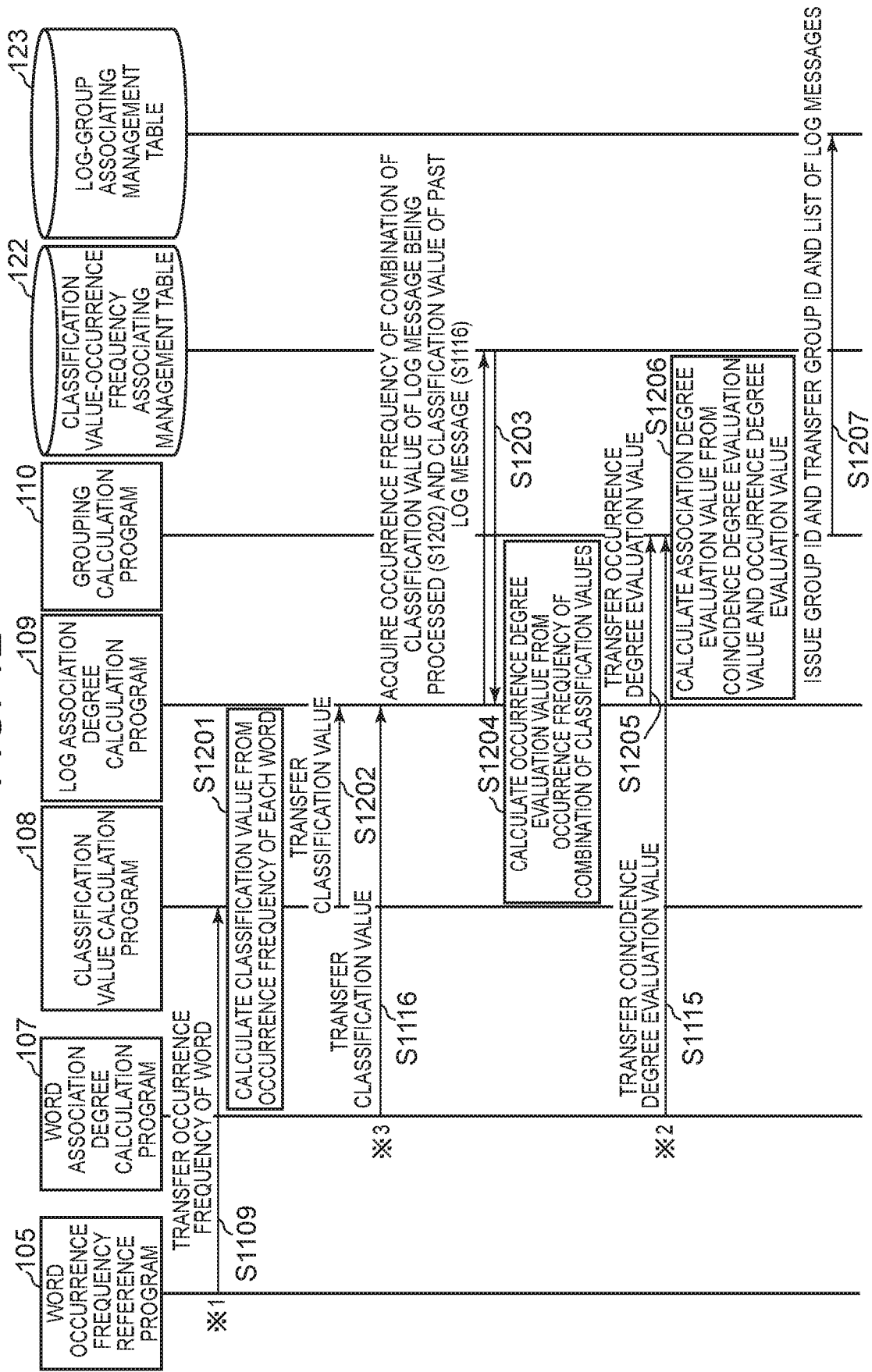
FIG. 12 is a sequence diagram showing an example of the process of calculating an occurrence degree evaluation value and an association degree evaluation value.

The process of calculating the occurrence degree evaluation value E2 and the association degree evaluation value E3 will next be descried with reference to FIG. 12. FIG. 12 is a sequence diagram showing an example of the process of calculating the occurrence degree evaluation value E2 and the association degree evaluation value E3.

Having accepted the log message 201 being processed and the list of the words to each of which the occurrence frequency has been linked from the word occurrence frequency reference program 105, the classification value calculation program 108 calculates the classification value on the basis of the occurrence frequencies (S1201). The classification value calculation program 108 transfers the log message 201 and the classification value thereof to the log association degree calculation program 109 (S1202). Having accepted the log message 201 being processed and the classification value thereof, the log association degree calculation program 109 refers to the after-learning classification value-occurrence frequency associating management table 122 for the combination of the classification value and the classification value of each of the past log messages 201 acquired in step S1115 to acquire the occurrence frequency of the combination of the two types of classification value (S1203). The log association degree calculation program 109 calculates the occurrence degree evaluation value E2 on the basis of the occurrence frequency of the combination of the classification values (S1204). The log association degree calculation program 109 transfers the log message 201 being processed, the past log messages 201, and the occurrence degree evaluation value E2 of the log messages 201 to the grouping calculation program 110 (S1205).

The grouping calculation program 110 calculates the association degree evaluation value E3 on the basis of the coincidence degree evaluation value E1 acquired from the word association degree calculation program 107 in step S1114 and the occurrence degree evaluation value E2 acquired from the log association degree calculation program 109 in step S1205 (S1206). The grouping calculation program 110 produces a group ID and stores the association degree evaluation value E3 (in a case where a plurality of association degree evaluation values E3 are present, the greatest association degree evaluation value E3) and the combination of the log messages 201 used to calculate the association degree evaluation value E3 with the group ID and the combination associated with each other in the log-group associating management table 123 (S1207).

Figure 13:
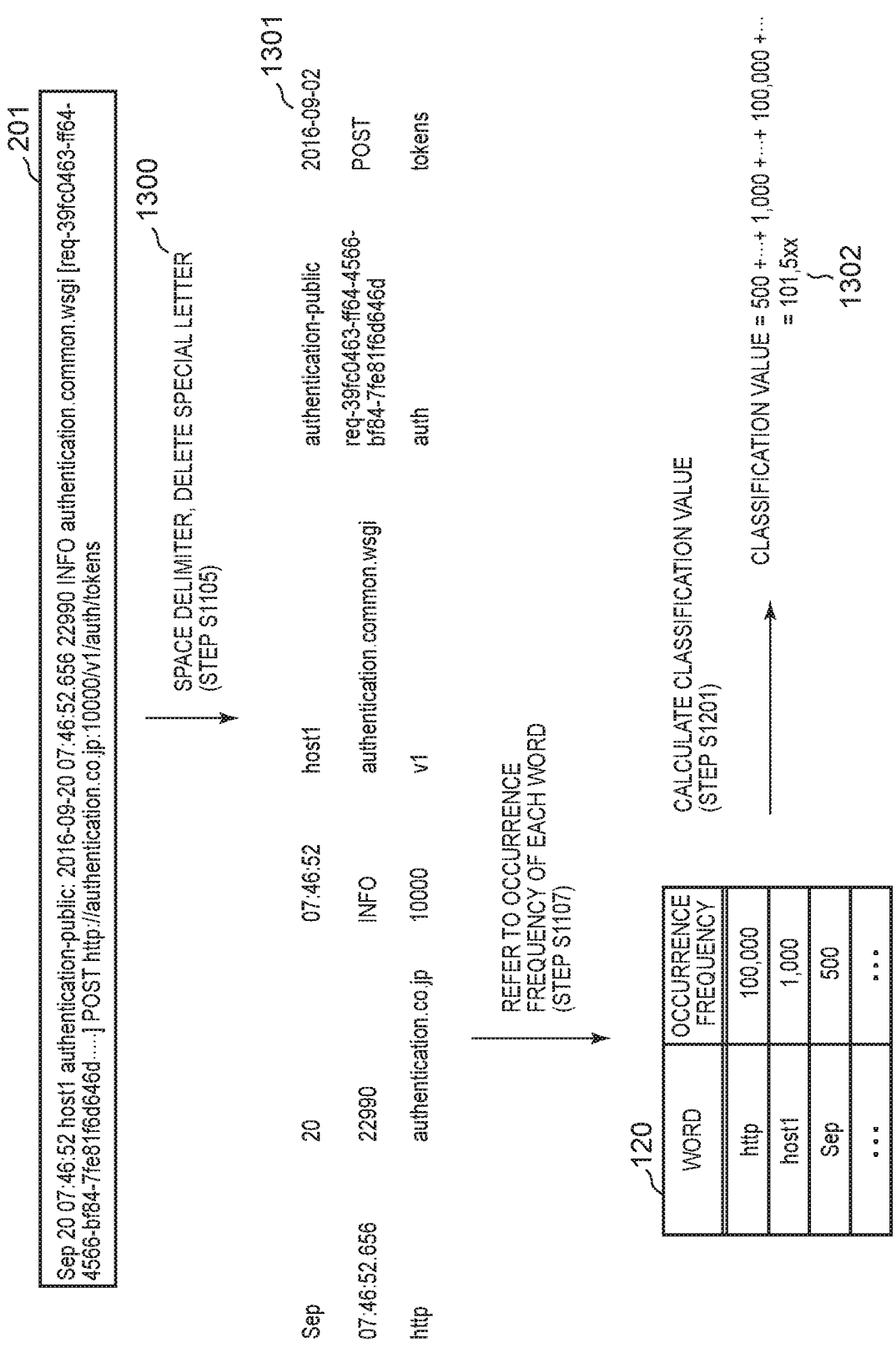
FIG. 13 describes an example of the method for calculating the classification value.

A method for calculating the classification value will next be described with reference to FIG. 13. FIG. 13 describes an example of the method for calculating the classification value.

The division program 103 divides a log message 201 into a word list 1301 on the basis of the division rule 1300 registered in step S1001 described above. The word occurrence frequency reference program 105 refers to the word-occurrence frequency associating management table 120 to acquire the occurrence frequency of each word and transfers the occurrence frequency to the classification value calculation program 108. The classification value calculation program 108 calculates the sum of the occurrence frequencies of each word on the basis thereof and configures the result of the calculation to be a classification value 1302.

Figure 14:
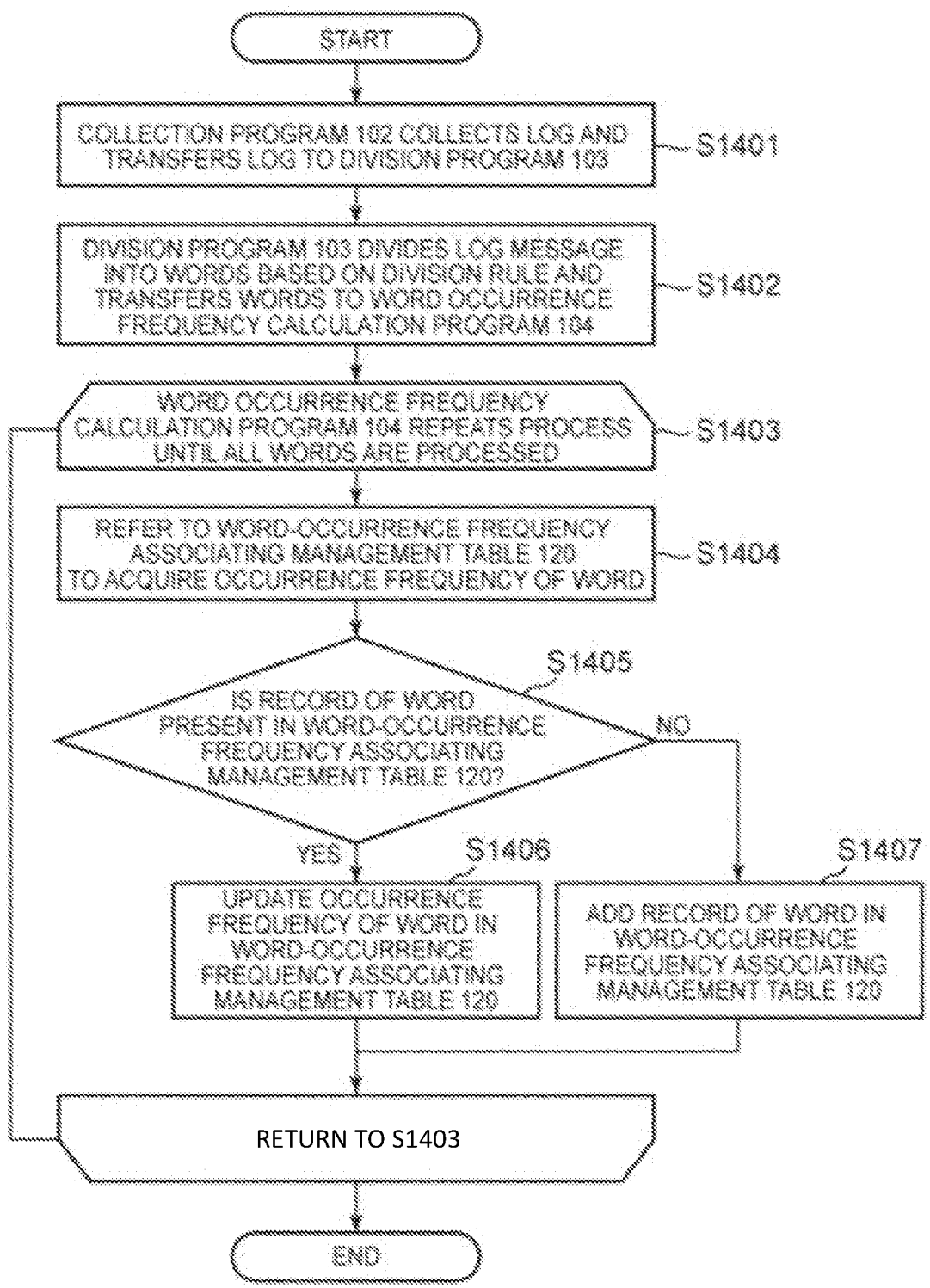
FIG. 14 is a flowchart showing an example of the process of calculating the occurrence frequency of a word.

The process of calculating the occurrence frequency of a word will next be described with reference to FIG. 14. FIG. 14 is a flowchart showing an example of the process of calculating the occurrence frequency of a word. The present flowchart corresponds to the processes in steps S1002 to S1007 in FIG. 10.

When the collection program 102 collects a log 200, the collection program 102 transfers the log 200 to the division program 103 (S1401), and the division program 103 acquires log messages 201 recorded in the log 200, divides each of the log messages 201 into words on the basis of the division rule, and transfers the words to the word occurrence frequency calculation program 104 (S1402). The word occurrence frequency calculation program 104 repeats steps S1404 to S1407 for each of the words contained in the list of the divided words (S1403). The word occurrence frequency calculation program 104 refers to the word-occurrence frequency associating management table 120 to acquire the occurrence frequency of each of the words (S1404). In a case where the word occurrence frequency calculation program 104 determines that a record containing the word is present in the word-occurrence frequency associating management table 120 (Yes in S1405), the word occurrence frequency calculation program 104 updates the occurrence frequency of the corresponding word in the word-occurrence frequency associating management table 120 (S1406), whereas in a case where the word occurrence frequency calculation program 104 determines that no record containing the word is present in the word-occurrence frequency associating management table 120 (No in S1405), the word occurrence frequency calculation program 104 adds a record of the word to the word-occurrence frequency associating management table 120 (S1407).

Figure 15:
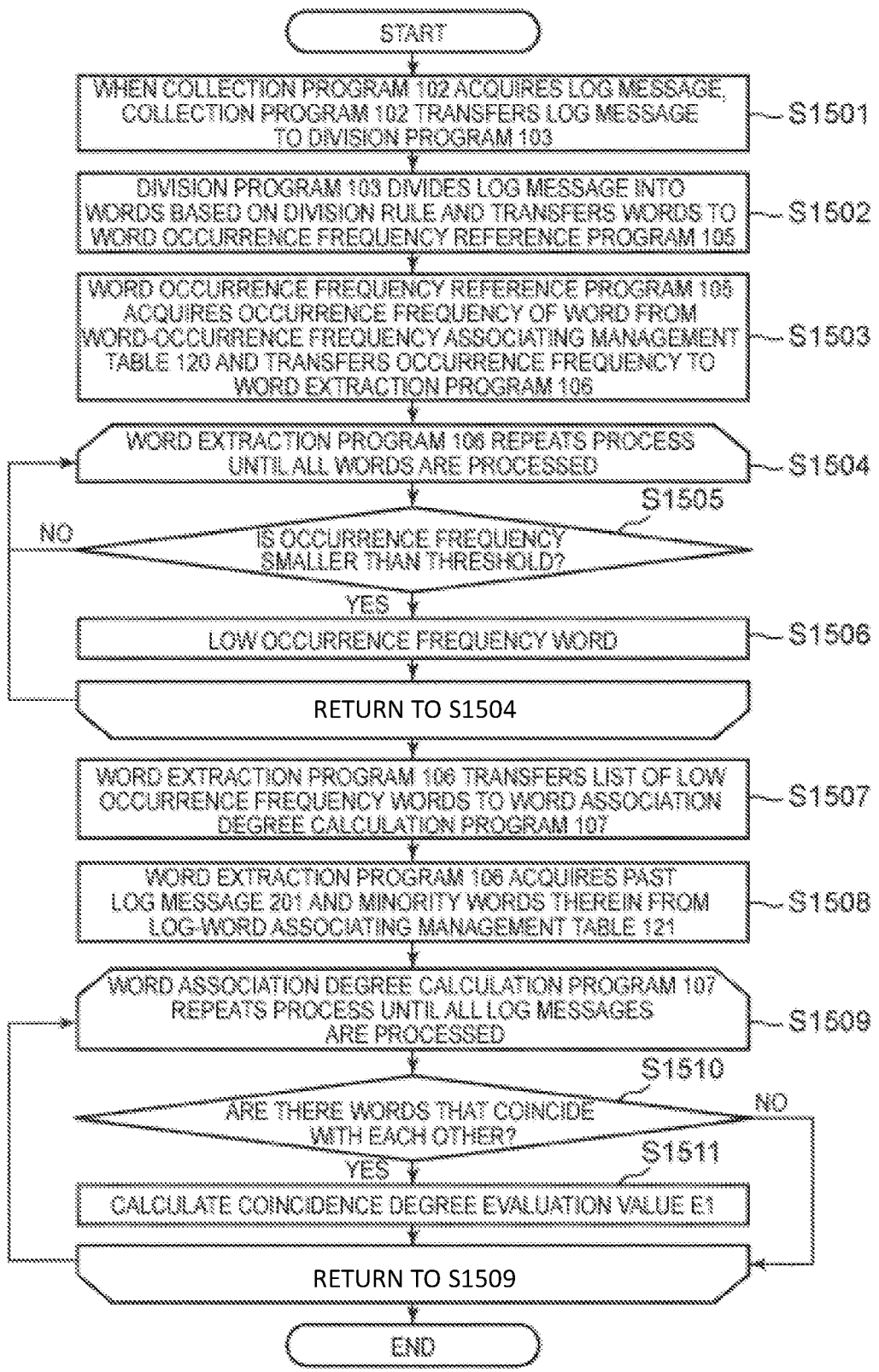
FIG. 15 is a flowchart showing an example of the process of calculating the coincidence degree evaluation value.

The process of calculating the coincidence degree evaluation value E1 will next be described with reference to FIG. 15. FIG. 15 is a flowchart showing an example of the process of calculating the coincidence degree evaluation value E1. The present flowchart corresponds to the processes in steps S1103 to S1113 in FIG. 11.

When the collection program 102 collects a log 200, the collection program 102 transfers the log 200 to the division program 103 (S1501), and the division program 103 divides each log message 201 recorded in the log 200 into words on the basis of the division rule and transfers the words to the word occurrence frequency reference program 105 (S1502). The word occurrence frequency reference program 105 refers to the after-learning word-occurrence frequency associating management table 120 to acquire the occurrence frequency of each word contained in the word list and transfers the occurrence frequency to the word extraction program (S1503). The word extraction program 106 repeats steps S1505 to S1506 for each of the words contained in the word list (S1504). In a case where the occurrence frequency of the word is smaller than the threshold (occurrence frequency determination threshold) (Yes in S1505), the word extraction program 106 determines that the word is a low occurrence frequency word (minority word), puts the word in a minority word list (S1506), and continues the following repetition. In a case where the occurrence frequency of the word is not smaller than the threshold (occurrence frequency determination threshold) (No in S1505), the word extraction program 106 determines that the word is not a minority word and proceeds to the following repetition.

When the repetition is completed, the word extraction program 106 transfers the minority word list to the word association degree calculation program 107 (S1507). The word association degree calculation program 107 acquires past log messages 201 having occurred within the threshold relating to time (process target period) and minority words in each of the past log messages 201 from the log-word associating management table 121 (step S1508). The word association degree calculation program 107 repeats steps S1510 to S1511 for each of the log message being processed and the past log messages (S1509). The word association degree calculation program 107 compares the list of the minority words in the log message 201 being processed that are acquired in step S1507 with the list of the minority words in each of the past log messages 201 that are acquired in step S1508, and in a case where there are words that coincide with each other (Yes in S1510), the word association degree calculation program 107 calculates the coincidence degree evaluation value E1 (S1511) and proceeds to the following repetition. In a case where there are not words that coincide with each other (No in S1510), the word association degree calculation program 107 proceeds to the following repetition.

Figure 16:
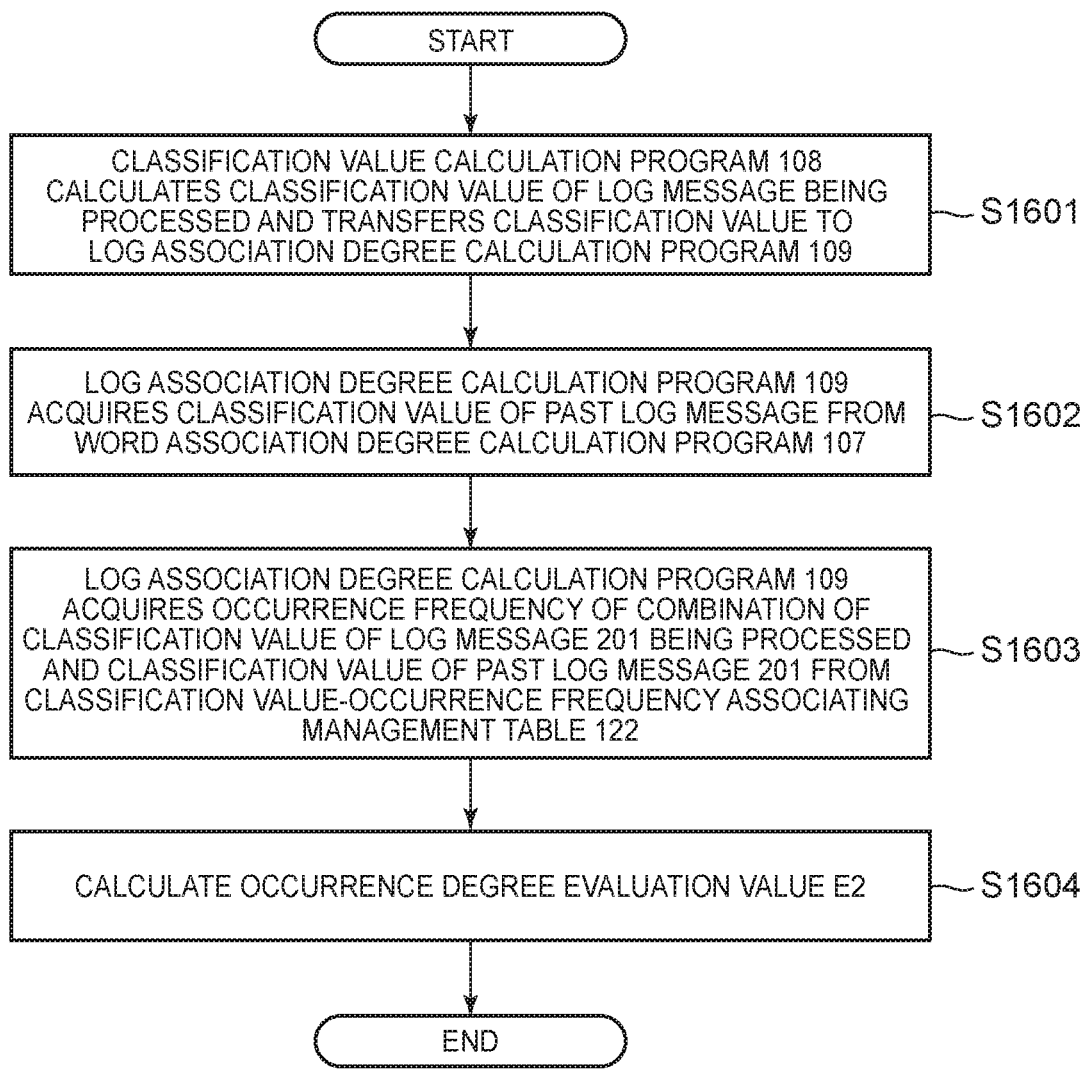
FIG. 16 is a flowchart showing an example of the process of calculating the occurrence degree evaluation value.

The process of calculating the occurrence degree evaluation value E2 will next be described with reference to FIG. 16. FIG. 16 is a flowchart showing an example of the process of calculating the occurrence degree evaluation value E2. The present flowchart corresponds to the processes in steps S1201 to S1204.

When the classification value calculation program 108 acquires the list of the words into which a log message is divided from the word occurrence frequency reference program 105, the classification value calculation program 108 calculates the classification value of the log message 201 being processed and transfers the classification value to the log association degree calculation program 109 (S1601). The log association degree calculation program 109 acquires the classification value of each of the past log messages from the word association degree calculation program 107 (S1602). The log association degree calculation program 109 refers to the classification value-occurrence frequency associating management table 122 for the combination of the classification value of the log message 201 being processed that has been acquired in step S1601 and the classification value of the past log message acquired in step S1602 to acquire the occurrence frequency of the combination of the classification values (S1603). The log association degree calculation program 109 calculates the occurrence degree evaluation value E2 on the basis of the occurrence frequency acquired in step S1603 (S1604).

The process in which the log message grouping apparatus 101 outputs a list of grouped log messages will be described with reference to FIG. 17. FIG. 17 is a flowchart showing an example of the process of outputting a list of grouped log messages to the management terminal 132.

When the log message grouping apparatus 101 (specifically, processor 401) accepts a request message transmitted from the management terminal 132 (S1701), the log message grouping apparatus 101 refers to the log-group associating management table 123 to search for a log message group 801 containing log messages 201 contained in the request message (S1702). The log message grouping apparatus 101 repeats the process in step S1704 for each of the log message groups 801 found in the search (S1703). In a case where the request message contains the lower limit of the association degree evaluation value E3, the lower limit is also included in the search condition, and the log message grouping apparatus 101 searches for a log message group 801 in a record in which the association degree evaluation value E3 stored in the degree of association 802 is the lower limit or greater. The log message grouping apparatus 101 acquires the log messages 201 stored in the log message group 801 and deletes redundant log messages 201 from the acquired log messages 201 to create a list of log messages that form a group (S1704). The log message grouping apparatus 101 transmits a response message containing the log message list to the management terminal 132 (S1705). The operator can thus acquire a list of log messages associated with one another as a group via the management terminal 132. The request message may contain the lower limit of the coincidence degree evaluation value E1 or the occurrence degree evaluation value E2 in place of the lower limit of the association degree evaluation value E3, and the search condition may include the lower limit of the coincidence degree evaluation value E1 or the occurrence degree evaluation value E2.

The processes in FIG. 17 will be described from the viewpoint of display operation performed by the management terminal 132 with reference to FIGS. 9(A) and 9(B). The operator acquires a log 200 from the log system 131 via the management terminal 132, and the management terminal 132 displays the log messages M101, M102, . . . in the log message display area 902, as shown in FIG. 9(A). The operator operates the management terminal 132 to input the lower limit of the association degree evaluation value E3 into the input box 905. In a case where a lower limit of 0 is inputted, the lower limit is ignored and is not included in the request message. The operator then clicks and selects one of the log messages M101, M102, . . . displayed in the log message display area 902 (log message M105 in example shown in FIGS. 9(A) and 9(B)). When the operator presses the group display button 904, a request message containing the selected log message and the lower limit of the association degree evaluation value E3 is produced and transmitted to the log message grouping apparatus 101.

When the request message is accepted by the log message grouping apparatus 101, log messages highly associated with the log message contained in the request message are grouped, and a response message containing the grouped log messages as a list of the log messages is transmitted. When the management terminal 132 receives the response message, the management terminal 132 displays the list of the log messages contained in the response message in the log message display area 902, as shown in FIG. 9(B). In the examples shown in FIGS. 9(A) and 9(B), it is assumed that the values shown in FIG. 8 are stored in the log-group associating management table 123. Therefore, in a case where the log message M105 is selected and the lower limit of the association degree evaluation value E3 is configured to be 0.60, the log message M105 and the log messages M101 and M103 associated with the log message M105 are displayed. Instead, in a case where the log message M105 is selected and the lower limit of the association degree evaluation value E3 is configured, for example, to be 0.80, a record in which the group ID is G2 is excluded, and the log message M105 and the log message M101 associated with the log message M105 are therefore displayed. As a result, inputting the lower limit of the association degree evaluation value E3 allows log messages 201 associated with one another as a group to be narrowed, whereby the accuracy of the association can be increased.

As described above, according to the present embodiment, the log message grouping apparatus 101 calculates the coincidence degree evaluation value E1 representing the degree of coincidence between minority words, which are relatively low occurrence frequency words, out of the words that form a log message 201 and minority words in another log message 201. Out of log messages 201 recorded in a log 200, since log messages 201 more highly associated with each other are therefore believed to contain more common minority words, using the degree of coincidence between minority words in a log message 201 and those in another log message 201 as an index allows the log messages 201 associated with each other to be grouped without preparation of information that associates the log messages 201 with each other as a group.

Further, the log message grouping apparatus 101 calculates the occurrence degree evaluation value E2 representing the degree of occurrence of the combination of the classification value of a log message 201 and the classification value of a past log message 201 on the basis of the occurrence frequency of the combination of the classification values and calculates the association degree evaluation value E3 representing the degree of association between the log message 201 and the past log message 201 on the basis of the coincidence degree evaluation value E1 and the occurrence degree evaluation value E2. As a result, using the occurrence degree evaluation value E2, which is based on the occurrence frequency of the combination of the classification values of the two log messages 201, as an index allows exclusion of the combination of classification values that rarely occur, that is, the combination of log messages 201 that rarely occur. Log messages 201 associated with each other can therefore be grouped with accuracy.

Since log messages can therefore be grouped without in-advance preparation of information that associates the log messages with each other as a group, analysis of log messages recorded in a log from an information system in which the log message output format is frequently changed can be assisted. Further, in an information system that concurrently carries out similar processes in parallel, even when log messages outputted in accordance with the processes are nested, the log messages can be grouped with accuracy.

In the embodiment described above, the association degree evaluation value E3 is used to evaluate the association between a log message 201 being processed and a past log message 201, but not necessarily. In addition, only the coincidence degree evaluation value E1 may be used to evaluate the association between log messages 201.

The embodiment of the present invention has been described with reference to the drawings, but the specific configuration of the present invention is not limited to the configuration in the embodiment described above, and a variety of variations of the configuration fall within the scope of the present invention. For example, the aforementioned embodiment has been described in detail in order to describe the present invention in a plain manner, and the present invention is not necessarily limited to the embodiment having all the described configurations. Further, part of the configuration of an embodiment can be replaced with another configuration, and another configuration can be added to the configuration of an embodiment. A design change and the like to the extent that they do not depart from the substance of the present invention fall within the scope of the present invention.

What is claimed is:

1. A log message grouping apparatus comprising a processor, the log message grouping apparatus being characterized in that the processor is configured to
   (a) collect a log that records a plurality of log messages,
   (b) acquire the plurality of log messages from the log,
   (c) acquire an occurrence frequency of each word that forms a first log message from word-occurrence frequency association information that is created based on the plurality of log messages contained in the log and stores each word contained in the plurality of log messages and the occurrence frequency of the word with the word and the occurrence frequency associated with each other,
   (d) store, in log-word association information, the first log message and a word that is one of words that form the first log message and occurs by a frequency smaller than a predetermined occurrence frequency determination threshold with the first log message and the word as a minority word associated with each other,
   (e) acquire the minority word contained in a second log message earlier than the first log message from the log-word association information,
   (f) calculate a first evaluation value that is an evaluation value representing a degree of coincidence between the minority word contained in the first log message and the minority word contained in the second log message,
   (g) produce a classification value that identifies the first log message and is determined based on the occurrence frequency of each word that forms the first log message,
   (h) store, in the log-word association information, the first log message and the classification value of the first log message with the first log message and the classification value associated with each other,
   (i) acquire the classification value of the second log message determined based on the occurrence frequency of each word that forms the second log message,
   (j) acquire the occurrence frequency of a combination of the classification value of the first log message and the classification value of the second log message from classification value-occurrence frequency association information that is created based on the plurality of log messages contained in the log and stores the combination of the classification values of the log messages determined based on the occurrence frequency of each word that forms each of the log messages and the occurrence frequency of the combination with the combination and the occurrence frequency associated with each other,
   (k) calculate a second evaluation value that is an evaluation value representing a degree of occurrence of the combination of the classification value of the first log message and the classification value of the second log message based on the occurrence frequency of the combination acquired from the classification value-occurrence frequency association information, and
   (l) calculate a third evaluation value that is an evaluation value representing a degree of association between the first log message and the second log message based on the first evaluation value and the second evaluation value.

2. The log message grouping apparatus according to claim 1, wherein the processor is further configured to
   (m) create the word-occurrence frequency association information, which stores each word contained in the plurality of log messages and the occurrence frequency of the word with the word and the occurrence frequency associated with each other.

3. The log message grouping apparatus according to claim 1, wherein the processor is further configured to
   (n) create the classification value-occurrence frequency association information, which stores the combination of the classification value of the first log message and the classification value of the second log message and the occurrence frequency of the combination with the combination and the occurrence frequency associated with each other.

4. The log message grouping apparatus according to claim 1, wherein the processor is further configured to
   (o) store, in log-group association information, the first log message and the second log message with the first log message and the second log message associated with each other as a group based on any of the first to third evaluation values.

5. The log message grouping apparatus according to claim 4, wherein the processor is further configured to
   (p) upon acceptance of a request that requests information on a log message, acquire a log message different from but associated with as a group a log message contained in the request from the log-group association information and output a response containing the different log message in response to the request.

6. The log message grouping apparatus according to claim 5, wherein
   the request contains information representing a condition relating to any of the first to third evaluation values, and the processor is further configured to
   (p') acquire a log message different from but associated with as a group the log message contained in the request and satisfying the condition from the log-group association information and output a response containing the different log message in response to the request.

7. A log message grouping system comprising:

one or multiple information systems each configured to output a log that records a log message;

a log message grouping apparatus configured to collect the logs and associate the log messages with one another as a group; and a management terminal configured to acquire information on the log messages associated with one another as a group from the log message grouping apparatus, wherein the log message grouping apparatus is formed of the log message grouping apparatus according to claim 6.

8. A log message grouping method, wherein a processor is configured to (a) collect a log that records a plurality of log messages, (b) acquire the plurality of log messages from the log, (c) acquire an occurrence frequency of each word that forms a first log message from word-occurrence frequency association information that is created based on the plurality of log messages contained in the log and stores each word contained in the plurality of log messages and the occurrence frequency of the word with the word and the occurrence frequency associated with each other, (d) store, in log-word association information, the first log message and a word that is one of words that form the first log message and occurs by a frequency smaller than a predetermined occurrence frequency determination threshold with the first log message and the word as a minority word associated with each other, (e) acquire the minority word contained in a second log message earlier than the first log message from the log-word association information, (f) calculate a first evaluation value that is an evaluation value representing a degree of coincidence between the minority word contained in the first log message and the minority word contained in the second log message, (g) produce a classification value that identifies the first log message and is determined based on the occurrence frequency of each word that forms the first log message, (h) store, in the log-word association information, the first log message and the classification value of the first log message with the first log message and the classification value associated with each other, (i) acquire the classification value of the second log message determined based on the occurrence frequency of each word that forms the second log message, (j) acquire the occurrence frequency of a combination of the classification value of the first log message and the classification value of the second log message from classification value-occurrence frequency association information that is created based on the plurality of log messages contained in the log and stores the combination of the classification values of the log messages determined based on the occurrence frequency of each word that forms each of the log messages and the occurrence frequency of the combination with the combination and the occurrence frequency associated with each other, (k) calculate a second evaluation value that is an evaluation value representing a degree of occurrence of the combination of the classification value of the first log message and the classification value of the second log message based on the occurrence frequency of the combination acquired from the classification value-occurrence frequency association information, and (l) calculate a third evaluation value that is an evaluation value representing a degree of association between the first log message and the second log message based on the first evaluation value and the second evaluation value.

* * * * *